US012798503B2

(12) United States Patent
Vardharajan

(10) Patent No.: US 12,798,503 B2
(45) Date of Patent: Nov. 17, 2026

(54) ACTIVITY PROFILE APPLICATION AND PORTABILITY TO FACILITATE VEHICLE CABIN CONFIGURATION

(71) Applicant: AT&T Intellectual Property I, L.P., Atlanta, GA (US)

(72) Inventor: Satya B. Vardharajan, San Diego, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 197 days.

(21) Appl. No.: 18/162,754

(22) Filed: Feb. 1, 2023

(65) Prior Publication Data

US 2023/0166680 A1 Jun. 1, 2023

Related U.S. Application Data

(63) Continuation of application No. 16/543,375, filed on Aug. 16, 2019, now Pat. No. 11,597,340.

(51) Int. Cl.
*B60R 16/037* (2006.01)
*B60N 2/02* (2006.01)
(Continued)

(52) U.S. Cl.
CPC .......... *B60R 16/037* (2013.01); *B60N 2/0292* (2013.01); *B60W 40/08* (2013.01); (Continued)

(58) Field of Classification Search
CPC ................ B60R 16/037; G05D 1/6445; G05D 1/0088; B60N 2/0292; B60N 2/0244; B60W 40/08; B60W 2540/043; B60W 2040/0809
See application file for complete search history.

(56) References Cited

U.S. PATENT DOCUMENTS 7,703,801 B2 4/2010 Levine
8,635,018 B2 1/2014 Chia et al.
(Continued)

FOREIGN PATENT DOCUMENTS

WO 2008/027684 A2 3/2008
WO 2014/172316 A1 10/2014

OTHER PUBLICATIONS

Algaze, Ben, "The connected car: much more than a smartphone on wheels", [retrieved from internet at https://www.extremetech.com/extreme/220793-the-connected-car-much-more-than-a-smartphone-on-wheels on Jun. 1, 2018] (9 pages).
(Continued)

*Primary Examiner* — Dale W Hilgendorf
*Assistant Examiner* — Hana Lee
(74) *Attorney, Agent, or Firm* — Guntin & Gust, PLC; Erik Boyd

(57) ABSTRACT

Application and portability of activity profiles and vehicle cabin configuration are facilitated. An example method includes receiving an activity profile and a user setting associated with a user. The activity profile is one of multiple predetermined activity profiles selectable by or associated with the user. The method includes applying the activity profile and the user setting to the vehicle to adjust at least one characteristic of the vehicle's cabin to facilitate a performance of an activity during navigation of the vehicle and/or while the vehicle is stationary. The activity profile and the user setting may be received during, prior to, or after receipt of data indicative of the user's identity. Applying of at least the activity profile to the vehicle may be performed upon successful authentication of the user.

20 Claims, 15 Drawing Sheets

(51) Int. Cl.
*B60W 40/08* (2012.01)
*G05D 1/00* (2024.01)
*G05D 1/644* (2024.01)

(52) U.S. Cl.
CPC ......... *G05D 1/0088* (2013.01); *G05D 1/6445* (2024.01); *B60N 2/0244* (2013.01); *B60W 2040/0809* (2013.01); *B60W 2540/043* (2020.02)

(56) References Cited

U.S. PATENT DOCUMENTS

| | | | |
|---|---|---|---|
| 9,401,845 B2 | 7/2016 | Cazanas et al. | |
| 9,694,770 B2 | 7/2017 | Tobin | |
| 9,694,771 B1 | 7/2017 | Ding | |
| 9,766,625 B2 | 9/2017 | Boroditsky et al. | |
| 9,908,508 B2 | 3/2018 | Phelan | |
| 9,971,348 B1 | 5/2018 | Canavor et al. | |
| 10,017,139 B2 | 7/2018 | Brenner et al. | |
| 11,538,347 B2 * | 12/2022 | Ratajczak | G06Q 10/0832 |
| 2006/0074557 A1 * | 4/2006 | Mulligan | G05D 1/0094 701/13 |
| 2011/0084852 A1 * | 4/2011 | Szczerba | G01C 21/3626 340/901 |
| 2012/0115446 A1 * | 5/2012 | Gautama | H04W 4/44 455/414.1 |
| 2012/0305705 A1 | 12/2012 | Vergnaud et al. | |
| 2015/0197205 A1 | 7/2015 | Kiong et al. | |
| 2016/0023762 A1 * | 1/2016 | Wang | B64F 1/22 701/3 |
| 2016/0167608 A1 | 6/2016 | Rai | |
| 2016/0196756 A1 * | 7/2016 | Prakash | B64U 70/95 701/3 |
| 2016/0318467 A1 | 11/2016 | Ricci | |
| 2017/0050645 A1 | 2/2017 | Porembski et al. | |
| 2017/0129500 A1 | 5/2017 | Hipp | |
| 2017/0190420 A1 * | 7/2017 | Lee | G01S 5/0284 |
| 2017/0197523 A1 | 7/2017 | Magana et al. | |
| 2017/0267124 A1 | 9/2017 | Numazawa et al. | |
| 2018/0043903 A1 | 2/2018 | Hosey et al. | |
| 2018/0074518 A1 * | 3/2018 | Cantrell | G05D 1/0676 |
| 2018/0208209 A1 | 7/2018 | Al-Dahle et al. | |
| 2018/0236900 A1 | 8/2018 | Miranda Nieto et al. | |
| 2018/0265094 A1 | 9/2018 | Graney | |
| 2018/0312083 A1 | 11/2018 | Perez Barrera et al. | |
| 2018/0349840 A1 * | 12/2018 | Gil | G08G 5/59 |
| 2019/0023278 A1 | 1/2019 | Lowry | |
| 2019/0191311 A1 | 6/2019 | O'Brien et al. | |
| 2019/0263424 A1 | 8/2019 | Penilla et al. | |
| 2019/0286793 A1 * | 9/2019 | Patton | G06F 16/29 |
| 2019/0299814 A1 | 10/2019 | Yetukuri et al. | |
| 2019/0318159 A1 | 10/2019 | Blanc-Paques et al. | |
| 2019/0370701 A1 | 12/2019 | Scaria et al. | |
| 2019/0385442 A1 * | 12/2019 | Perez Barrera | G08G 5/0013 |
| 2020/0218271 A1 * | 7/2020 | Krystek | G06F 16/285 |
| 2020/0353882 A1 | 11/2020 | Beiser et al. | |
| 2022/0383728 A1 * | 12/2022 | Brown | G08B 25/08 |

OTHER PUBLICATIONS

Non-Final Office Action received for U.S. Appl. No. 16/543,375 dated May 24, 2021, 49 pages.

Final Office Action received for U.S. Appl. No. 16/543,375 dated Oct. 8, 2021, 55 pages.

Non-Final Office Action received for U.S. Appl. No. 16/543,375 dated Mar. 2, 2022, 38 pages.

Final Office Action received for U.S. Appl. No. 16/543,375 dated Aug. 5, 2022, 34 pages.

Notice of Allowance received for U.S. Appl. No. 16/543,375 dated Nov. 2, 2022, 29 pages.

* cited by examiner

800

810 805 815 820 825 830 835 840 845 850 855

| Identifier | Activity Profile | Seat A | Seat B | Desk | Temp | Bed | Computer | Conf System | Light A | Light B | ... |
|---|---|---|---|---|---|---|---|---|---|---|---|
| 1 | Conventional Ride | $v_{A1}$ | $v_{B1}$ | $d_1$ | 80 | no | no | no | $w_{A1}$ | $w_{B1}$ | ... |
| 2 | Conversation | $v_{A2}$ | $v_{B2}$ | $d_2$ | 80 | no | no | no | $w_{A2}$ | $w_{B2}$ | ... |
| 3 | Rest & Relaxation | $v_{A3}$ | $v_{B3}$ | $d_3$ | 77 | no | no | no | $w_{A3}$ | $w_{B3}$ | ... |
| 4 | Entertainment | $v_{A4}$ | $v_{B4}$ | $d_4$ | 77 | no | no | no | $w_{A4}$ | $w_{B4}$ | ... |
| 5 | Dining | $v_{A5}$ | $v_{B5}$ | $d_5$ | 75 | no | no | no | $w_{A5}$ | $w_{B5}$ | ... |
| 6 | Sleep | $v_{A6}$ | $v_{B6}$ | $d_6$ | 75 | yes | no | no | $w_{A6}$ | $w_{B6}$ | ... |
| 7 | Work | $v_{A7}$ | $v_{B7}$ | $d_7$ | 77 | no | yes | no | $w_{A7}$ | $w_{B7}$ | ... |
| 8 | Audio/video Conference | $v_{A8}$ | $v_{B8}$ | $d_8$ | 77 | no | yes | yes | $w_{A8}$ | $w_{B8}$ | ... |

FIG. 8

ACTIVITY PROFILE APPLICATION AND PORTABILITY TO FACILITATE VEHICLE CABIN CONFIGURATION

RELATED APPLICATION

The subject patent application is a continuation of, and claims priority to, U.S. patent application Ser. No. 16/543,375, filed Aug. 16, 2019, and entitled "ACTIVITY PROFILE APPLICATION AND PORTABILITY TO FACILITATE VEHICLE CABIN CONFIGURATION," the entirety of which priority application is hereby incorporated by reference herein.

FIELD

This disclosure relates generally to vehicle operation and, more particularly, to activity profile application and portability to facilitate vehicle cabin configuration.

BACKGROUND

Vehicles may be controlled by networks of embedded systems, called electronic control units (ECUs), which control different aspects of vehicle performance and functionality. In some instances, an ECU may control an individual system or functionality of a vehicle. That is, the ECU may control and/or adjust components of the system with which the ECU is associated according to given operating parameters. In some cases, decentralized control of a vehicle may be facilitated by using a control area network (CAN) bus standard that allows ECUs to communicate with one another without the need for a host computer (e.g., head unit). Operating parameters for the ECUs may be set and adjusted based on manufacturer's settings and/or user selection for example. In the various operating scenarios/applications, setting and/or adjusting of operating parameters applied to a vehicle may be facilitated through communication between the vehicle and other devices.

BRIEF DESCRIPTION OF THE DRAWINGS

FIG. 8 illustrates an example of a table of activity profiles in accordance with one or more embodiments of the present disclosure.

Figure 1A:
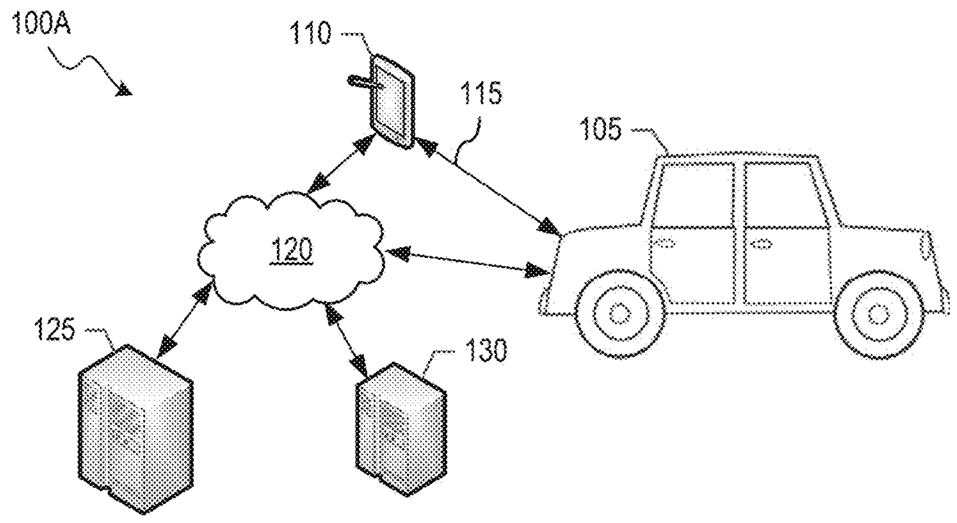
FIGS. 1A through 1D illustrate examples of network environments for facilitating activity profile application and portability and vehicle cabin configuration in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Using various embodiments, application and portability of activity profiles may allow users to effectuate a vehicle cabin configuration to provide a desired cabin experience for the users. The various embodiments may be used for terrestrial vehicles (e.g., cars), naval vehicles, aerial vehicles, or generally any vehicle for which activity profiles may be defined and applied (e.g., to enhance user's ride experience). The vehicles may be manned vehicles (e.g., including self-driving vehicles), unmanned vehicles (e.g., unmanned cars, unmanned aerial vehicles (UAVs)), or varying degrees thereof (e.g., unmanned drive functionality while providing ways to effectuate manual take-over).

Each activity profile may be defined by a combination of parameters that control different cabin systems installed in the vehicle. The parameters may be provided as instructions to the cabin systems by a cabin systems controller. The parameters set for the cabin systems may allow the cabin systems, in the aggregate, to effectuate changes to a cabin environment (e.g., also referred to as a cabin ambience) to provide a desired cabin experience to the user during travel or while the vehicle is stationary. Each cabin system may adjust a behavior, a location, and/or an orientation of an object in the cabin based on instructions from the cabin system controller. By way of non-limiting examples, the cabin systems may control a behavior, a location, and/or an orientation associated with illumination (e.g., light sources); audio; video; heating, ventilation, and air conditioning (e.g., climate control); furniture; communications; power; appliances; computing devices; gaming devices; external visibility; and so forth. In applying such an activity profile to a vehicle, the vehicle may provide a desired cabin experience to a user (e.g., a rider of the vehicle).

In various aspects, for a given vehicle, an activity profile may be selected by a user using a user device (e.g., smartphone, smartwatch) and stored in the user device for convenient retrieval. For example, the user device may have an application (e.g., app) installed that allows the user to select, via the app, the activity profile to apply to the vehicle. In another embodiment, the activity profile may be stored in a cloud portal or on a remote server accessible by the user device (e.g., with or without utilizing the app). The user device may transmit the activity profile to the vehicle, and the vehicle may apply the activity profile to effectuate a vehicle cabin configuration associated with the activity profile in order provide the user with the user's desired cabin experience. In some cases, the user may have multiple user devices (e.g., with the appropriate application installed) that may interface with the vehicle. The vehicle may also have an appropriate application installed thereon for interfacing with the user device(s) (e.g., interfacing with the appropriate application installed on the user device(s)). In some cases, the user may associate the same activity profile or different activity profiles to different vehicles associated with the user.

In an embodiment, a vehicle may apply an activity profile provided by a user that has activity profile setting privileges. In some cases, a user having activity profile setting privileges may transfer the activity profile setting privileges to another user (e.g., temporarily, permanently, and/or conditionally). In an aspect, in cases where multiple users may have activity profile setting privileges, each of these users may be associated with a priority value such that the vehicle may apply the activity profile provided by a current user of the vehicle that has the highest priority value. For example, the vehicle may request an activity profile from the user associated with the highest priority value. In some cases, each of multiple users may effectuate his or her own ride experience characteristics without affecting ride experience characteristics of other users.

By tying the activity profile(s) to the user device, the user may readily set the activity profile (e.g., such as a default activity profile) for any given vehicle associated with the user. Such an approach may be more convenient than having the user manually set the activity profile to apply to each vehicle on a vehicle-by-vehicle basis, especially in cases where the user is scheduled to use a given vehicle for a short duration (e.g., has a short-term association with the vehicle).

In one or more embodiments, a method to facilitate application and portability of activity profiles and vehicle cabin configuration includes receiving, by a first application associated with a vehicle from a second application associated with a user device, data indicative of an identity of a user. The method further includes receiving, by the first application, a request to navigate from a starting point to a destination point. The method further includes receiving, by the first application, an activity profile associated with the user and a user setting associated with the user. The activity profile is one of a plurality of predetermined activity profiles selectable by or associated with the user. The method further includes applying, by the vehicle, the activity profile and the user setting to the vehicle to adjust at least one characteristic of a cabin of the vehicle to facilitate a performance of an activity by the user during navigation of the vehicle and/or while the vehicle is stationary. The method further includes navigating the vehicle from the starting point to the destination point.

In one or more embodiments, a vehicle includes one or more processors. The vehicle further includes a non-transitory machine-readable medium comprising instructions stored therein, which when executed by the one or more processors, cause the one or more processors to perform operations. The operations include detecting a user device associated with a user is within a predetermined distance of the vehicle. The operations further include determining an activity profile associated with the user and a user setting associated with the user. The activity profile is one of a plurality of predetermined activity profiles. The method further includes applying the activity profile and the user setting to the vehicle to adjust a cabin of the vehicle to facilitate the user performing of an activity during navigation of the vehicle and/or while the vehicle is stationary.

In one or more embodiments, a tangible or non-transitory machine-readable storage medium includes machine readable instructions which, when executed, cause one or more processors of a device to perform operations. The operations include receiving data indicative of an identity of a user. The operations further include determining, based on the identity of the user, an activity profile (e.g., a default activity profile) and a user setting. The activity profile is one of a plurality of predetermined activity profiles. The operations further include applying the activity profile and the user setting to the vehicle to adjust at least one characteristic of a cabin of the vehicle. The operations further include transmitting an indication that the activity profile and the user setting have been successfully applied.

The scope of the disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

Various techniques are provided for facilitating activity profile application and portability on vehicles. An activity profile is selectable by a user and may be defined by a combination of cabin characteristics that controls a cabin configuration of a vehicle to provide a desired cabin experience. In an aspect, such cabin characteristics may be referred to as default cabin characteristics associated with the activity profile or predetermined cabin characteristics associated with the activity profile. The cabin can be controlled to facilitate a performance of an activity (e.g., also referred to as a purpose), such as by one or more riders of the vehicle. In some aspects, the performance of the activity may be facilitated during navigation of the vehicle and/or while the vehicle is stationary and turned on. Vehicles may include terrestrial vehicles (e.g., cars), naval vehicles, aerial vehicles, or generally any vehicle for which activity profiles may be defined and applied (e.g., to enhance user experience and productivity). As one example, a vehicle may have a capacity to hold between zero and eight riders. The vehicles may be manned vehicles, unmanned vehicles (e.g., unmanned cars, UAVs), or varying degrees thereof (e.g., unmanned drive functionality while allowing manual takeover).

In one example, a vehicle may have one or more drivers (e.g., pilot, co-pilot) and one or more passengers. In another example, a vehicle may have only one or more drivers or only one or more passengers. In a further example, a vehicle (e.g., a self-driving vehicle) may have no drivers and one or more passengers who may have no or some control of various aspects of the vehicle's operation, including "driving" of the vehicle. In another example, a vehicle may have no drivers and no passengers. In the example case with no riders (i.e., no drivers and no passengers), the vehicle may be an unmanned vehicle that carries payload (e.g., produce, livestock, package, sensor equipment), in which the activity profile applied by a user to the unmanned vehicle may primarily be to provide a cabin configuration that facilitates payload safety, vehicle safety, vehicle efficiency (e.g., fuel efficiency), and/or timeliness for example. As an example, in a vehicle without any riders, the activity profile may define a cabin having a certain storage area size and storage area temperature to maintain freshness of produce and minimize/avoid any movement of the produce during vehicle movement that may cause harm to the produce. As another example, an unmanned vehicle may be utilized to transport payload (e.g., a camera) from a starting location to a destination location and/or effectuate use of the payload at the starting location, destination location, and/or en route from the starting location to the destination location (e.g., for a surveillance application).

Using various embodiments, a rider(s) of the vehicle is able to utilize travel time more productively by applying (e.g., setting) an activity profile to the vehicle appropriate to adjust the vehicle's cabin to facilitate performance of a certain activity. In one example case, the vehicle is an autonomous vehicle or otherwise a vehicle that is driven without user intervention. All riders of this vehicle are freed from the activity of driving and can instead plan to utilize travel time productively. In another example case, the vehicle may be driven by a driver of a ride hailing service. In this latter example, while the driver is driving, a passenger(s) of the vehicle is able to utilize travel time more productively by applying an activity profile to the vehicle. In some cases, the vehicle has an activity profile applied to it when the vehicle is stationary (e.g., in a parked mode but turned on), which may be the same or different from the activity profile applied while the vehicle is navigating, such that the vehicle may be utilized to facilitate performance of an activity while the vehicle is stationary. Non-limiting examples of activity profiles may include and may be referenced as (e.g., identified as for user selection) a Conventional Ride activity profile, a Work activity profile, an Entertainment activity profile, a Rest & Relaxation activity profile, a Meeting activity profile, a Dining activity profile, and an Audio/Visual Conference activity profile.

In various embodiments, vehicle cabin systems (e.g., also referred to simply as cabin systems) of the vehicle (e.g., installed in the vehicle) may collectively (e.g., in the aggregate) operate to configure the vehicle's cabin to facilitate a performance of an activity at least in part by providing a certain cabin experience (e.g., creating an environment or ambience in the cabin). Cabin systems may be provided by ECUs of the vehicle. As provided above, the performance of the activity can be facilitated during navigation of the vehicle and/or while the vehicle is stationary. In some aspects, for a given cabin system, a configuration adjusted by the cabin system may include a behavior, a location, and/or an orientation, such as of an object controlled by the cabin system. A cabin system may adjust a behavior, a location, and/or an orientation of cabin characteristics such as, by way of non-limiting examples, illumination (e.g., lighting); audio; video; heating, ventilation, and air conditioning (HVAC) (e.g., climate control); furniture; communications; safety; power; appliances; computing devices; gaming devices; and external visibility. As an example, movement and/or rotation of an object (e.g., a seat, a desk, a light source) in the cabin of the vehicle may be effectuated through control of actuators, rails, and/or other components of one or more cabin systems. As an example, a behavior of an object (e.g., on or off state of a light source, brightness of a light source) in the cabin of the vehicle may be effectuated through control, by one or more cabin systems, of power sources, switches, and/or other components.

Collectively, cabin characteristics, such as defined in an activity profile and a user setting(s), give riders (e.g., drivers if any, passengers) of vehicles a certain cabin experience. In various applications, cabin experience is provided primarily for the passengers to allow the passengers to perform a desired activity (e.g., working, resting, dining) while the vehicle is navigating (e.g., autonomously driving or being driven by a driver) and/or stationary. In this regard, by way of non-limiting examples, activity profiles may define locations and orientations of various objects (e.g., furniture such as seats, desk, light sources), a temperature (e.g., temperature range) to be maintained by in a cabin (or a portion thereof) by a heating system of the vehicle, music (e.g., type of music, user's playlist) to be played by a stereo in the cabin (or a portion thereof), on or off state of appliances (e.g., toasters, microwaves, etc.) in the cabin, on or off state of devices (e.g., computers), and/or others. A user setting(s) may be applied to customize cabin characteristics of an activity profile. In some cases, when an activity profile does not include a specific value (e.g., behavior, location, orientation) for one or more cabin characteristics, the vehicle can set these cabin characteristics to their corresponding default value (e.g., value set by the manufacturer or vehicle administrator that has been tested for safety). Such default values may be determined to generally be harmonious across different applied activity profiles. In some cases, such default values may be adjusted in response to user settings.

Alternatively, or in addition to changes effectuated to the vehicle's cabin by applying an activity profile and a user setting(s) using the user device, the cabin characteristics may be readily adjusted by the user by pressing buttons, turning knobs, or controlling various other types of controls provided by the vehicle, such as to adjust lighting (e.g., turn on or off light sources, adjust intensity of light, etc.), adjust an air-conditioner, change music volume, change music, etc.

A cabin systems controller of the vehicle may receive an indication of an activity profile to apply to the vehicle, generate instructions based on the activity profile, and transmit the instructions to appropriate cabin systems of the vehicle to effectuate desired adjustments to the vehicle's cabin. In this regard, the instructions may cause the cabin systems to adjust a configuration (e.g., a behavior, a location, and/or an orientation) of a portion of (e.g., an object in) the vehicle's cabin. The cabin systems controller may verify that the cabin systems are receiving and complying with (e.g., successfully implementing) the instructions to achieve a desired cabin configuration. In some aspects, in addition to the activity profile, the cabin systems controller may also receive one or more user settings (e.g., also referred to as user customizations, user instructions, or user preferences) to adjust one or more characteristics of the cabin. The cabin systems controller may generate the instructions based on the activity profile as well as the user setting(s). In some cases, the user setting(s) provides an adjustment(s) to a cabin configuration provided by the activity profile. In this regard, a user may provide user setting(s) to personalize/customize the activity profile to better suit the user.

The activity profiles may take many different forms. For example, the activity profiles may be configuration files, data structures, markup language documents, text files, etc. For a given vehicle, the activity profiles may be processed (e.g., parsed) by a cabin systems controller of the vehicle to generate instructions and these instructions provided to appropriate cabin systems to effectuate a cabin configuration of the vehicle. These activity profiles may be utilized by consumers so that the consumers may enact changes to their vehicle's cabin.

In some embodiments, the activity profiles may be stored and managed by an activity profile management system. In some aspects, the activity profile management system may be provided and maintained by a vehicle original equipment manufacturer (OEM). In some cases, the vehicle OEM may certify or validate that the activity profiles are safe to use. Such certification/validation may involve tests for safety (e.g., passenger safety and vehicle safety) over a range of cabin characteristics (e.g., behaviors, locations, and/or orientations) for objects in the cabin. For a given activity profile, the tests may identify the range of cabin characteristics that can be safety applied. A safety range for any given cabin characteristic may set limits on customization a user can apply (e.g., using user settings provided by the user) on top of applying an activity profile. For a given activity profile, the cabin systems controller may be utilized to generate appropriate instructions to allow applying of the activity profile to the vehicle to provide a cabin experience according to the activity profile and any user settings.

Activity profiles may be developed, provided, and/or managed by the vehicle OEM and/or other parties. A service provider (e.g., vehicle rental provider, ride hailing company, dealership), mobile network operator, and/or another party may access and/or provide access (e.g., for user devices) to the activity profile management system. For example, the activity profile management system and/or the activity profiles may be maintained at least in part by a group of vehicle manufacturers (e.g., a group of car manufacturers). The activity profile management system may include a listing of predetermined activity profiles selectable by a user (e.g., a vehicle manufacturer, a consumer of a vehicle, etc.). In an embodiment, the activity profile management system may facilitate and/or otherwise be associated with a vehicle selling, renting, and/or sharing service. A user of such a service may set up an account with this service to buy a vehicle, rent a vehicle, or schedule usage of a vehicle and/or obtain access activity profiles.

In an aspect, a user may adjust an activity profile by providing user settings to the activity profile. The user may tie such adjustments to the user's device(s) and/or the user's account. In some cases, the user may store data indicative of the activity profile and the user settings as a separate, user-created activity profile. For example, a "Meeting" activity profile with the user settings applied thereto may be stored as a separate activity profile that the user names "My Meeting." In some cases, the user may provide such customized activity profiles to other users, such as directly to other users and/or to a server (e.g., the activity profile management system) for distribution to other users.

Activity profiles may be defined in various manners. In some embodiments, activity profiles may provide a baseline behavior, location, and/or orientation for various aspects (e.g., objects) of the cabin that can be applied across a broad range of vehicles, such as vehicles from different manufacturers, vehicles of different types (e.g., economy car, economy aerial vehicle, van, first responder terrestrial and/or aerial vehicle, etc.), vehicles in different regions of the world, etc. In some embodiments, activity profiles may provide a baseline behavior, location, and/or orientation limited to a certain group of vehicles (e.g., same manufacturer, same type, same country, etc.). For an activity profile to be applied to a vehicle, the baseline behavior, location, and orientation for each aspect of the cabin is applied to the vehicle. A user may adjust the cabin characteristics by providing user settings to apply to the vehicle.

In general, the baseline behaviors, locations, and/or orientations that define activity profiles may be processed (e.g., normalized) on a vehicle-by-vehicle basis such that they may be adapted for application to a range of vehicles. In one example case, for a Meeting activity profile applied to a van that accommodates up to four riders, a cabin configuration may include providing four desks, four seats, and lights with behavior (e.g., brightness for the lights), location, and orientation according to the Meeting activity profile. For the Meeting activity profile applied to an economy car that similarly accommodates up to four riders, the cabin configuration may be scaled appropriately to accommodate the smaller size of the economy car's cabin relative to the van's cabin. As one example, the van's cabin may allow for larger desks, larger seats, larger distances between desks, larger distances between seats, and/or others than the economy car's cabin. As another example, the van's cabin may have lights brighter than lights of the economy car's cabin, since the riders of the van's cabin are (on average) farther away from the lights than the riders of the economy car's cabin. In some aspects, the cabin systems controller and/or other processor of a given vehicle (e.g., the van or the economy car) may process the baseline behaviors, locations, and/or orientations of the activity profile to obtain a set of behaviors, locations, and/or orientations specific to the vehicle.

In some embodiments, the baseline behaviors, locations, and/or orientations may be adjusted (e.g., by the activity profile management system) based on user settings provided by users. Users may allow data indicative of the user settings to be provided for adjustment of activity profiles (e.g., the baseline of the activity profiles). Such data may be provided in a manner that the users providing the data remain anonymous unless specified otherwise by the users. For example, consider a Work activity profile that provides seats and desks for riders and sets a light source to a low brightness. When a sufficiently large number of users apply the Work activity profile and provide a user setting to increase the brightness of the light source, the baseline behavior of the light source for the Work activity profile may be adjusted to be brighter. In this manner, using various embodiments, as activity profiles are applied and user settings are applied on top of these activity profiles, the baseline cabin characteristics for each activity profile may be adjusted such that, over time, the number of user settings and/or degree of adjustments (e.g., amount of deviation from the user's preferences relative to the activity profile's baselines) provided by users are reduced. Such adjustments of activity profiles may place less or no weight on user settings considered to be outliers. The activity profile management system and/or other system may determine a user setting to be an outlier when the user setting causes a behavior, a location, and/or an orientation to deviate significantly from a certain average/baseline behavior, location, and/or orientation.

In some aspects, an initial baseline for a given activity profile may be set by a vehicle manufacturer, group of vehicle manufacturers, and/or other entities. In some cases, the initial baseline for a given activity profile may further be based on results from simulations, human testers, and so forth. In some cases, when a user can store their customized activity profiles, such as the “My Meeting” activity profile provided above, the “My Meeting” activity profile may be tied to the more general “Meeting” activity profile, such that user settings to the “My Meeting” activity profile may provide data indicative of potential adjustments to the baselines provided by the “Meeting” activity profile.

Different vehicles may be tested for compatibility with activity profiles, such as during design and manufacture of the vehicles and/or post-manufacturing of the vehicles. Compatibility of a vehicle with an activity profile may be based at least on whether the vehicle can be operated safely (e.g., safe balance, safe temperature, safe turns, etc.) when the activity profile is applied. For instance, pieces of furniture, alone and in combination, may need to be provided at certain absolute locations and/or relative locations (in relation to each other) to provide a safe balance in weight for a vehicle. For a given vehicle, the vehicle may be tested for compatibility with one or more activity profiles and certified accordingly. For example, a given vehicle may be designed to provide a cabin configuration for common activity profiles, such as a Work activity profile, an Entertainment activity profile, a Rest & Relaxation activity profile, a Meeting activity profile, a Dining activity profile, and an Audio/Visual Conference activity profile. In some cases, testing of an activity profile on the vehicle post-manufacturing may occur when an activity profile is defined after the vehicle has been manufactured.

Certification/validation services of the vehicle with various activity profiles may be provided by the provider of the activity profile management system (e.g., vehicle OEM) and/or other authorized party. In some aspects, the activity profile management system may store the activity profiles, data indicative of which activity profiles can be applied to which vehicles, and/or other data. In some cases, users may adjust the activity profiles and store the adjusted activity profiles as user-customized activity profiles. In some cases, activity profiles and/or user-customized activity profiles may be distributed for use by various users.

In some embodiments, to facilitate application and portability of activity profiles, user devices (e.g., also referred to as personal electronic devices or client devices) may communicate with the vehicles directly or via one or more networks connected to the user devices and the vehicles. For example, the user devices and vehicles may communicate with each other directly (e.g., wirelessly via Bluetooth® communications, near-field communications (NFC), infrared communications, etc. and/or wired via universal serial bus (USB) communications) and/or via one or more networks (e.g., Wi-Fi networks, cellular networks).

For a given vehicle, the vehicle may receive data indicative of an identity of a user of a user device, such as during a handshake procedure between the vehicle and the user device. In an aspect, the handshake procedure may be, may include, or may be a part of, an authentication procedure. Based on the identity of the user, the vehicle may determine whether the user of the user device has activity profile setting privileges. In an aspect, the user that has activity profile setting privileges may be referred to as a captain of the vehicle. The captain of the vehicle may be the user that owns the vehicle, rents the vehicle, has hailed the vehicle for a trip (e.g., through a ridesharing service or ride-hailing service), or otherwise has previously been designated by some party (e.g., owner, renter, previous captain, vehicle administrator) as the captain of the vehicle. In another example, the captain of the vehicle may be the user seated in a particular seat of the vehicle (e.g., pilot’s seat), which may be determined based on object detection technology provided by the vehicle and/or weight detected on seats of the vehicle.

In some cases, the captain may designate how the handshake operation is performed (e.g., whether the captain’s device or the vehicle initiates the handshake operation), who can apply the activity profile (e.g., a transfer of privileges by the captain to another user), and/or how the activity profile may be transferred to the vehicle. In some cases, the captain may provide settings to the vehicle and/or user device during an initial setup of the vehicle and/or in a user profile of the captain (e.g., user profile for a vehicle rental service).

If the vehicle determines that the user has activity profile setting privileges (e.g., the user is a captain), the vehicle may receive an activity profile associated with the captain. In some cases, the vehicle may receive the activity profile from the user device (e.g., smartphone, smartwatch, tablet device) of the user. The vehicle may determine whether the activity profile can be applied to the vehicle. The vehicle may apply the activity profile to adjust the cabin of the vehicle when the vehicle determines that the activity profile can be applied to the vehicle. In some cases, the activity profile can be applied only while the vehicle is not in transit (e.g., to ensure safety of the riders). For example, the activity profile may be changed only when the vehicle is completely parked. Upon successfully applying the activity profile, the vehicle may indicate that the activity profile has been successfully applied. For example, the vehicle may display a textual and/or pictorial indication on a monitor provided in the vehicle and/or transmit the textual and/or pictorial indication to the user’s device (e.g., for display by the user’s device). If the activity profile is not successfully applied (e.g., including only partially successfully applied), the vehicle may indicate such to the user device. In some cases, the vehicle may identify ways the user can rectify the situation.

In an aspect, an activity profile that can be applied to the vehicle may be referred to as being compatible with the vehicle. In contrast, an activity profile that cannot be applied to the vehicle may be referred to as being not compatible with the vehicle. In some cases, the user device may identify the vehicle based on data received by the user device from the vehicle during the handshake procedure, such as an official vehicle identification number of the vehicle or generally any vehicle identifier (e.g., name, number) previously applied to the vehicle by a user, and the user device may transmit to the identified vehicle the activity profile associated with the identified vehicle.

In some cases, if the vehicle determines that the activity profile cannot be applied to the vehicle, in some embodiments, the vehicle may suggest an activity profile that can be applied to the vehicle. The suggested activity profile(s) may be considered to be most similar to the activity profile that cannot be applied to the vehicle. For example, if the vehicle cannot apply a Sleeping activity profile, the vehicle may determine that a Rest & Relaxation activity profile available to the vehicle is most similar to the Sleeping activity profile and suggest the Rest & Relaxation activity profile to the user. For example, the vehicle may transmit an indication (e.g., a suggestion) to the user device of the user about the Rest & Relaxation activity profile. In an aspect, the vehicle may determine a similarity between the Sleeping activity profile and the Rest & Relaxation activity profile by comparing a behavior, a location, and/or an orientation associated with various aspects of the vehicle’s cabin (e.g., seats, beds, lighting, etc.) for the Sleeping activity profile and the Rest & Relaxation activity profile. Alternatively, or in addition, the vehicle may transmit to the user device of the user a listing of activity profiles that can be applied to the vehicle. The vehicle may then receive from the user device an activity profile selected from the listing and apply the activity profile. If the vehicle receives no response from the user device pertaining to a selected activity profile, the vehicle can apply a default activity profile (e.g., previously set by a manufacturer of the vehicle, a vehicle administrator, the user, or other party).

In an embodiment, the vehicle may receive data indicative of different users' identities from different user devices, request an activity profile from the user that has profile setting privileges (e.g., the user associated with the highest priority value), and apply (if compatible) the activity profile provided by the user that has profile setting privileges. Activity profiles from users without profile setting privileges (if received) may be ignored (e.g., dropped) by the vehicle. In some cases, the vehicle may transmit a message to the user device of the user confirming that the user has activity profile setting privileges, and/or the vehicle may transmit a message indicating to the user devices of the other users that they do not have activity profile setting privileges (e.g., they are not captains of the vehicle). In some cases, when the vehicle is used exclusively by non-captains (e.g., and a captain does not temporarily transfer profile setting privileges), the vehicle may operate according to previously provided settings and may indicate to user devices of the non-captains (e.g., via corresponding apps installed on the user devices) the activity profile that has been successfully applied. For example, based on previously provided settings (e.g., from a captain, vehicle administrator, vehicle manufacturer, etc.), the vehicle may apply a default activity profile (e.g., previously set by the captain, vehicle administrator, vehicle manufacturer, etc.) or may allow any non-captain to select and apply an activity profile.

In some aspects, the vehicle may only have one captain assigned at a time. The captain may temporarily, permanently, and/or conditionally transfer activity profile setting privileges to another user. For example, the captain may conditionally transfer activity profile setting privileges based on time of day, day of week, duration of vehicle usage, purpose of vehicle usage, activity profile another user intends to apply, and/or other conditions. In other aspects, the vehicle may have multiple users with activity profile setting privileges (e.g., multiple captains). In these aspects, each captain may be associated with a priority value. For example, when nine different users are designated as captains of the vehicle, each of the nine captains may be associated with a different priority value between 1 and 9, inclusive, where 1 is assigned to the captain with the highest priority and 9 is assigned to the captain with the lowest priority. In this example, when the user devices of the captain assigned a priority value of 2 and the captain assigned a priority value of 6 are providing activity profiles to the vehicle, the vehicle applies the activity profile of the captain assigned the priority value of 2. The captains may temporarily or permanently adjust the priority values of the various captains and/or add captains (e.g., introduce a new tenth captain and redefine priority values as being between 1 and 10, inclusive). Other manners by which users can be designated as captains and/or assigned priority values can be utilized.

In an embodiment, as captains board and/or exit the vehicle, the vehicle may selectively adjust the activity profile applied to the vehicle based on the relative priority values associated with the captains in the vehicle after such boarding and/or exiting. For example, when the highest priority captain exits the vehicle, the vehicle may transmit a message to a next highest priority captain still in the vehicle or in proximity of the vehicle requesting user input regarding whether to continue applying the currently applied activity profile (e.g., previously set by the captain who exited the vehicle) or to transition to a different activity profile. If the next highest priority captain does not respond within a threshold amount of time, the currently applied activity profile may continue to be applied. In an aspect, if no captains remain in the vehicle, the vehicle may continue to apply a currently applied activity profile (e.g., set or maintained by the last captain to exit the vehicle). In an aspect, a user may be considered to have exited the vehicle when the user is no longer detected by the vehicle (e.g., using object recognition technology and/or weight applied on the vehicle's seats), and/or the user device of the user and/or the user is farther than a threshold distance from the vehicle (e.g., based on distance between the vehicle and the user device).

The activity profile setting privileges may pertain primarily to configuring the cabin of the vehicle using a user device to communicate with the vehicle. For example, any user (e.g., rider) of the vehicle may still adjust cabin characteristics by manually interacting with appropriate buttons, knobs, levers, etc. to control the corresponding cabin system (e.g., air-conditioning system, music system, chair arrangements, etc.) to effectuate a desired cabin experience.

Thus, in various embodiments, by tying a user's activity profiles to the user's device(s) and/or user's account (e.g., account for a service that facilitates vehicle ownership, rental, or sharing), the user has ready access to activity profiles (e.g., stored on one or more user devices of the user or on a remote server or via a cloud portal accessible to the user) that the user can apply to a vehicle. In some cases, the user may have multiple user devices configured to communicate with the vehicle. For example, the multiple user devices and the vehicle may have appropriate hardware, software, and/or firmware that may interface each other. In some cases, such interfacing between the user devices and the vehicle may be performed via corresponding applications installed on the user devices and the vehicle.

In some aspects, the user may set an activity profile and/or a user setting (e.g., user adjustment to the activity profile) to be provided automatically to any vehicle that the user device can authenticate itself to. For example, the user may set the manner by which the user device and the vehicle communicate automatically, such that minimal manual interaction from the user is needed. In other aspects, the user may set different activity profiles and/or user settings to be applied to different vehicles to be used by the user (e.g., vehicles owned, rented, or otherwise scheduled for use by the user). This contrasts with cases where the user needs to manually set the activity profile and/or user settings to apply to a vehicle on a vehicle-by-vehicle basis. For example, such manual setting of the activity profile on a vehicle-by-vehicle basis may be especially inconvenient when the user does not own a vehicle but rather intends to rent vehicles (e.g., via a ride-hailing service) for short durations of time.

Turning now to the figures, FIGS. 1A, 1B, 1C, and 1D illustrate examples of network environments 100A, 100B, 100C, and 100D, respectively, for vehicle cabin configuration facilitated via activity profile application and portability in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided.

It is noted that sizes of various components and distances between these components are not drawn to scale in FIGS. 1A-1D. In FIGS. 1A-1D, arrows represent signal communication between two components. For example, in FIG. 1A, an arrow 115 represents signal communication between a vehicle 105 and a user device 110. In some cases, the arrow 115 may represent a wireless connection(s), a wired connection(s), or a combination thereof. Furthermore, although FIGS. 1A-1D depict vehicles (e.g., 105, 135) as a car, techniques described herein may generally be applied to any terrestrial vehicle, naval vehicle, and/or aerial vehicle.

In FIG. 1A, the network environment 100A includes the vehicle 105, the user device 110, a network 120, a user profile management system 125, and an activity profile management system 130. The vehicle 105, user device 110, network 120, user profile management system 125, and activity profile management system 130 may be in communication directly or indirectly. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

One or more characteristics of a cabin of the vehicle 105 may be configured based on an activity profile applied to the vehicle 105. The activity profile applied to the vehicle 105 may be a default activity profile (e.g., set by a manufacturer, a vehicle administrator, a provider of the vehicle 105, a provider of a service, or a user of the vehicle 105) or an activity profile selected by a user (e.g., current user) of the vehicle 105. The user of the vehicle 105 may be a rider of the vehicle 105. In some cases, the vehicle 105 may be an unmanned vehicle, in which each user of the vehicle 105 is a passenger. In some cases, the vehicle 105 may have no riders. For example, the user of the vehicle 105 may use the vehicle 105 to transport payload (e.g., produce, package, sensor equipment). For a given operation (e.g., a trip(s)) of the vehicle 105, one or more users of the vehicle 105 may have profile setting privileges for the vehicle 105. In some cases, a user setting(s) may also be applied to the vehicle 105. The user setting(s) may be considered to be adjustments (e.g., user customizations) to the activity profile. The user setting(s) may be from users (e.g., riders) of the vehicle 105 that may or may not have profile setting privileges. The vehicle 105 may include a global positioning system (GPS) to facilitate navigation from a starting point to a destination point.

The vehicle 105 may include a vehicle communication unit (e.g., also referred to simply as a communication unit). The communication unit may include one or more radio transceivers (e.g., antennas) along with associated logic, circuitry, interfaces, memory, and/or code that enable communications (e.g., with the user device 110, network 120, user profile management system 125, activity profile management system 130, and/or other devices) via wireless interfaces and using the radio transceivers. In an embodiment, the vehicle 105 may send and/or receive information via communications in accordance with wireless communication standards or protocols, such as a cellular standard, Institute of Electrical and Electronics Engineers (IEEE) 802.11 standard, Bluetooth® standard, ZigBee® standard, and/or other wireless standards; NFC; infrared-based communications; optical-based communications; and/or other appropriate communication standards and/or protocols. In some cases, the vehicle 105 may be configured to communicate with the user device 110, network 120, user profile management system 125, activity profile management system 130, and/or other devices using a proprietary wireless communication protocol and interface.

Alternatively, or in addition, the communication unit of the vehicle 105 may include suitable logic, circuitry, interfaces, memory, and/or code that enable wired communications (e.g., with the user device 110, network 120, user profile management system 125, activity profile management system 130, and/or other devices). In this regard, the vehicle 105 may be configured to interface with a wired network, such as via an Ethernet interface, a power-line modem, a Digital Subscriber Line (DSL) modem, a Public Switched Telephone Network (PSTN) modem, a cable modem, and/or other appropriate components for wired communication. A wired link may be implemented with a USB cable, power-line cable, coaxial cable, fiber-optic cable, or other cable or wires that support corresponding wired network technologies. For instance, the communication unit of the vehicle 105 may be, or may include, a USB port that can receive a USB cable. When the USB cable is used to connect the user device 110 to the vehicle 105, the USB cable may be used to transmit data to and/or receive data from the user device 110.

The user device 110, network 120, user profile management system 125, activity profile management system 130, and/or other devices may include communication units appropriate for communicating with each other and/or the vehicle 105. By way of non-limiting examples, the user device 110 may be, and/or may include, a mobile phone (e.g., smartphone), smartwatch, a personal digital assistant (PDA), a tablet device, a laptop device, a watch, a computer, or generally any device that is operable to communicate via wireless communication (e.g., via cellular standards using antennas) and/or wired communication (e.g., USB). In some cases, to allow the user to apply activity profiles to various vehicles, the user device 110 may be a portable device.

In some embodiments, the communication unit of the vehicle 105 may communicate directly with the user device 110 (e.g., directly with a communication unit of the user device 110 in a non-networked manner), such as via Bluetooth communication and/or NFC communication. For instance, the communication unit of the vehicle 105 may be, or may include, an NFC device (e.g., NFC tag) in the cabin of the vehicle 105 that may transmit data to and/or receive data from the user device 110 when the user device 110 is placed in proximity of the NFC device.

Alternatively, or in addition, in some embodiments, the vehicle 105 may be in communication with other components via the network 120. As one example, the network 120 may be, may include, or may be a part of, a cellular network. In this example, the communication unit of the vehicle 105 may send and/or receive information over the cellular network (e.g., 3G, 4G, 5G, other 3GPP-based cellular network, and/or other cellular network), such as to and/or from the user device 110 via one or more base stations (not shown in FIG. 1A) of the network 120. The base station(s) may be macrocell base station(s), microcell base station(s), picocell base station(s), femtocell base station(s), and/or other cell sizes. Although the network 120 is depicted as a single network, the network 120 may include one or more networks. In this regard, the network 120 may represent one or more wireless networks (e.g., cellular network, Wi-Fi network) and/or one or more wired networks.

The user profile management system 125 may include components for managing user profiles. The user profile management system 125 may store, or may otherwise have access to, user profiles. Each user profile may be associated with a user. For a given user, the user profile may include an identity of the user (e.g., account username, name, contact information, biometrics, etc.). In some aspects, the user profile may include an activity profile and/or a user setting(s) provided by the user that the user intends to apply to vehicles (e.g., the vehicle 105). In an aspect, the user profile management system 125 may include data identifying vehicles associated with the user, and whether the user has profile setting privileges on a vehicle-by-vehicle basis. In some cases, the user profile may allow the user to indicate the activity profile and/or user setting(s) to be applied to all vehicles associated with the user. In one case, setting a common activity profile to all vehicles associated with the user may be useful for fleet management. In other cases, the user profile may allow the user to indicate different activity profiles and/or user settings on a vehicle-by-vehicle basis. In an embodiment, the user profile management system 125 may be provided by a service provider (e.g., vehicle rental provider), mobile network operator, and/or another party. The user profile management system 125 may provide vehicle selling, renting, and/or sharing services and/or may provide services for storing data for and/or interfacing with such vehicle selling, renting, and/or sharing services.

The user profile management system 125 may manage user profiles, such that existing user profiles may be deleted (e.g., users manually deleted their user profiles, users did not renew their subscription, etc.) and/or new user profiles may be set up (e.g., new users subscribe to a service, such as a car rental service, and/or existing users opening another account). For example, the user profile management system 125 may host a website, an application, or otherwise provide an interface to allow new users to set up an account and/or existing users to adjust information associated with the user (e.g., activity profiles, user cabin settings, identification information, contact information, etc.) or delete their accounts. In some cases, the user profile management system 125 may perform authentication processes and/or provide data (e.g., transmit data or otherwise allow access to data) to facilitate performing of authentication processes (e.g., by the vehicle 105 or other devices).

The activity profile management system 130 may include components for managing activity profiles. The activity profile management system 130 may store, or may otherwise have access to, activity profiles. In some cases, the activity profile management system 130 may store, or may otherwise have access to, user ratings for the activity profiles. A given user rating may be associated with an activity profile and a vehicle (e.g., a type of vehicle, characteristics of the vehicle, a manufacturer of the vehicle, etc.) on which the activity profile is applied. The user ratings may be accessible to users (e.g., via a website and/or an app) to help users research available activity profiles (e.g., help users determine which activity profiles have been or have not been well received) and select an activity profile. In some cases, new activity profiles may be developed and stored on the activity profile management system 130, and/or existing activity profiles may be disabled (e.g., removed, marked as obsolete, marked as unsafe, etc.). In some aspects, the activity profiles may be stored in the activity profile management system 130 as a listing of predetermined activity profiles. In some embodiments, the activity profile management system 130 and/or other systems may process user settings provided by users to adjust baseline cabin characteristics (e.g., behaviors, locations, and/or orientations of cabin objects) for the various activity profiles.

In some aspects, the activity profile management system 130 may store the activity profiles, data indicative of which activity profiles can be applied to which vehicles, and/or other data. In an embodiment, different vehicles may be designed to support various activity profiles. The vehicles may be tested for compatibility with various activity profiles, such as during design and manufacture of the vehicles or post-manufacturing of the vehicles. In some cases, such as for compatibility of an activity profile that is determined after manufacture of the vehicle 105, the activity profile management system 130 may provide an update to the vehicle 105 to indicate whether the activity profile can or cannot be applied to the vehicle 105. In some cases, the activity profile management system 130 may provide, facilitate, and/or otherwise be associated with, certification services that certify compatibility of the vehicle with various activity profiles. Alternatively, or in addition, in some cases, the activity profile management system 130 may provide, facilitate, and/or otherwise be associated with, certification services that certify the various activity profiles.

In an aspect, the activity profile management system 130 and/or the activity profiles may be provided and maintained by a vehicle OEM. For example, the activity profile management system 130 and/or the activity profiles may be maintained at least in part by a group of vehicle manufacturers (e.g., a group of car manufacturers). A manufacturer of each vehicle (e.g., the vehicle 105) may have a database of associated and safe activity profiles that can be associated with the vehicle's version/vintage. In some cases, third parties, such as ride hail companies, rental companies, and other service providers, may provide their respective services by accessing the activity profile management system 130. In some cases, the provider of the activity profile management system 130 may also provide the user profile management system 125, and/or may otherwise operate in conjunction with or be associated with a provider of the user profile management system 125. The user profile management system 125 and/or activity profile management system 130 may be provided by cloud-based servers.

In some embodiments, to facilitate application and portability of an activity profile and a user setting(s), the vehicle 105 may communicate with the user device 110. In an aspect, the vehicle 105 and the user device 110 may have corresponding applications installed, such that the vehicle 105 and the user device 110 may interface (e.g., communicate, exchange data) with each other via the corresponding applications. A handshake procedure (e.g., also referred to as an authentication procedure) may be performed between the user device 110 and the vehicle 105 to allow secure authentication. During the handshake procedure, the user device 110 may transmit authentication data to the vehicle 105. The authentication data may include data indicative of an identity of a user of the user device 110. The identity of the user may include a name (e.g., account username, legal name, etc.), biometrics, account number, and/or generally any identification data that may be utilized by the vehicle 105 to authenticate the user. As one example, the identity of the user may be an account username of an application logged in by the user. As another example, the identity of the user may include biometrics (e.g., fingerprint, facial recognition or facial landmark recognition) for use in biometric authentication. The identity of the user may also identify user privileges to set an activity profile and provide user settings.

The handshake procedure may be initiated by the user device 110 or the vehicle 105. The handshake procedure may be conducted via messages communicated between the user device 110 and the vehicle 105. The transfer of authentication data to the vehicle 105 may be initiated by the user device 110, or the authentication data may be transferred by the user device 110 in response to a query from the vehicle 105.

In some cases, the handshake procedure may be set to occur automatically when a distance between the user device 110 and the vehicle 105 is within a threshold distance. Depending on communication method, the threshold distance may be from a few inches to a few meters. As one example, the vehicle 105 may be, or may include, an NFC device (e.g., NFC tag) that may transmit data to and/or receive data from the user device 110 when the user device 110 is placed in proximity of the NFC device (e.g., within a few inches). For instance, the user may bring the user device 110 close to the NFC device installed in the vehicle 105. As another example, using geolocation/fencing approaches, the vehicle 105 may monitor for devices (e.g., up to a few meters) with appropriate capability for providing authentication data and/or activity profiles to the vehicle 105 and initiate a query to the user device 110 (e.g., an application installed on the user device 110) when the user device 110 is within a threshold distance. In one case, the communication between the user device 110 and the vehicle 105 may be via Wi-Fi, cellular, and/or Bluetooth communication.

In some aspects, the vehicle 105 may authenticate the user device 110 based on user profiles stored in the vehicle 105. In some cases, the authentication data from the user device 110 is validated with locally cached user data and/or user data stored in the user profile management system 125. For example, the vehicle 105 may compare the authentication data provided by the user with data contained in the user profiles stored in the vehicle 105 to determine whether there are any matches. In other aspects, the vehicle 105 may authenticate the user device 110 by communicating with the user profile management system 125. In these aspects, the vehicle 105 may relay the authentication data (or a portion thereof) received from the user to the user profile management system 125. The user profile management system 125 may perform authentication of the user and indicate to the vehicle 105 and/or user device 110 whether authentication is successful, and/or the user profile management system 125 may provide information to the vehicle 105 to allow the vehicle 105 to perform authentication.

Other approaches by which to perform a handshake procedure may be utilized. In general, a manner by which to initiate and/or perform the handshake procedure may be based on settings from a user, a vehicle manufacturer, a vehicle administrator, a service provider, and/or a fleet manager. The service provider and/or the fleet manager may be a vehicle rental service provider. In some cases, the user of the user device 110 may set in the user device 110 and vehicle 105 which approach(es) to utilize to initiate and/or perform a handshake procedure. The user's selected approach(es) may be previously set as part of the user's settings (e.g., stored in the user device 110 and/or user profile management system 125) and/or during an initial association procedure between the vehicle 105 and the user device 110.

Upon successful authentication, the vehicle 105 may determine whether the user of the user device 110 has profile setting privileges based on the identity of the user. For example, the vehicle 105 may access the user profile and/or other data to determine whether the user of the user device 110 has profile setting privileges. Such data may be stored in the vehicle 105, user device 110, and/or user profile management system 125. In one case, the vehicle 105 may determine whether such data is stored in the vehicle 105 and, if such data is not stored in the vehicle 105 or such data has expired, the vehicle 105 may request such data from the user profile management system 125. The vehicle 105 may then store such data received from the user profile management system 125 for future use. In some cases, the vehicle 105 may determine whether the user of the user device 110 has profile setting privileges as part of the handshake and authentication procedure.

Upon determining the user has activity profile setting privileges, the vehicle 105 may determine the activity profile associated with the user of the user device 110. For example, the vehicle 105 may retrieve an activity profile associated with the user (e.g., stored in the vehicle 105 and/or user profile management system 125) and/or request the user device 110 to provide the activity profile to the vehicle 105. In one case, the vehicle 105 may determine whether such data is stored in the vehicle 105 and, if such data is not stored in the vehicle 105, the vehicle 105 may request such data from the user profile management system 125. The vehicle 105 may then store such data received from the user profile management system 125 for future use. In an aspect, for a given activity profile associated with the user, the vehicle 105 may retrieve a user setting(s) associated with the user and/or prompt the user device 110 to provide a user setting(s).

In some cases, the activity profile may be provided together with or soon after the authentication data is provided. For example, the activity profile may be provided before successful authentication of the user device 110. In other cases, the user device 110 may provide the activity profile only after successful authentication of the user device 110 to the vehicle 105. In some cases, the user device 110 may receive an indication of a successful authentication and/or a failed authentication of the user device 110 to the vehicle 105 (e.g., from the vehicle 105 and/or user profile management system 125). If authentication of the user device 110 fails, the vehicle 105 and/or user profile management system 125 may indicate to the user device 110 that the authentication failed, request alternative authentication data from the user device 110, and/or ignore the user device 110 (e.g., drop subsequent communications received from the user device 110).

An activity profile can only be applied once authentication data is received and successfully validated. The vehicle 105 may determine whether the activity profile associated with the user can be applied to (e.g., is compatible with) the vehicle 105. If the vehicle 105 determines that the activity profile can be applied, the vehicle 105 applies the activity profile. For example, the vehicle 105 may determine that the vehicle 105 is registered/certified to operate safely when the cabin of the vehicle 105 is adjusted according to the activity profile. In some cases, the vehicle 105 may also receive a user setting(s) from the user (e.g., in a same communication as the activity profile or as a separate communication(s)) and apply the user setting(s) to the vehicle 105.

In some cases, the user of the user device 110 may provide a listing (e.g., a ranked listing) of activity profiles. In these cases, the vehicle 105 may go down the listing (e.g., starting from an activity profile having a highest priority) until one of the user's activity profiles can be applied to the vehicle 105. If none of the activity profile(s) provided by the user of the user device 110 can be applied to the vehicle 105, the vehicle 105 may apply a default activity profile (e.g., set by the manufacturer or vehicle administrator of the vehicle 105) that can be applied to the vehicle 105. As another example, the vehicle 105 may transmit a listing of predetermined activity profiles that can be applied to the vehicle 105 to the user device 110 and request selection of one or more of the activity profiles in the listing. In an aspect, the listing of activity profiles of the vehicle 105 may be a subset of the predetermined activity profiles stored by the activity profile management system 130. The user device 110 may provide to the vehicle 105 the activity profile(s) selected by the user. Based on user settings, the vehicle 105 and/or user profile management system 125 may store the activity profile selected by the user for future use. If the user device 110 does not provide an activity profile to the vehicle 105 (e.g., within a threshold amount of time of the request from the vehicle 105), the vehicle 105 may apply a default activity profile.

If the user of the user device 110 has not set an activity profile for the user, the vehicle 105 may apply a default activity profile. Alternatively, the vehicle 105 may request that the user device 110 provide an activity profile and/or transmit a listing of predetermined activity profiles to the vehicle 105 that can be applied to the vehicle 105. The user device 110 may provide to the vehicle 105 the activity profile selected by the user. Based on user settings, the vehicle 105 and/or user profile management system 125 may store the activity profile selected by the user for future use. If the user device 110 does not provide an activity profile to the vehicle 105 (e.g., within a threshold amount of time), the vehicle 105 may apply a default activity profile.

Figure 1B:
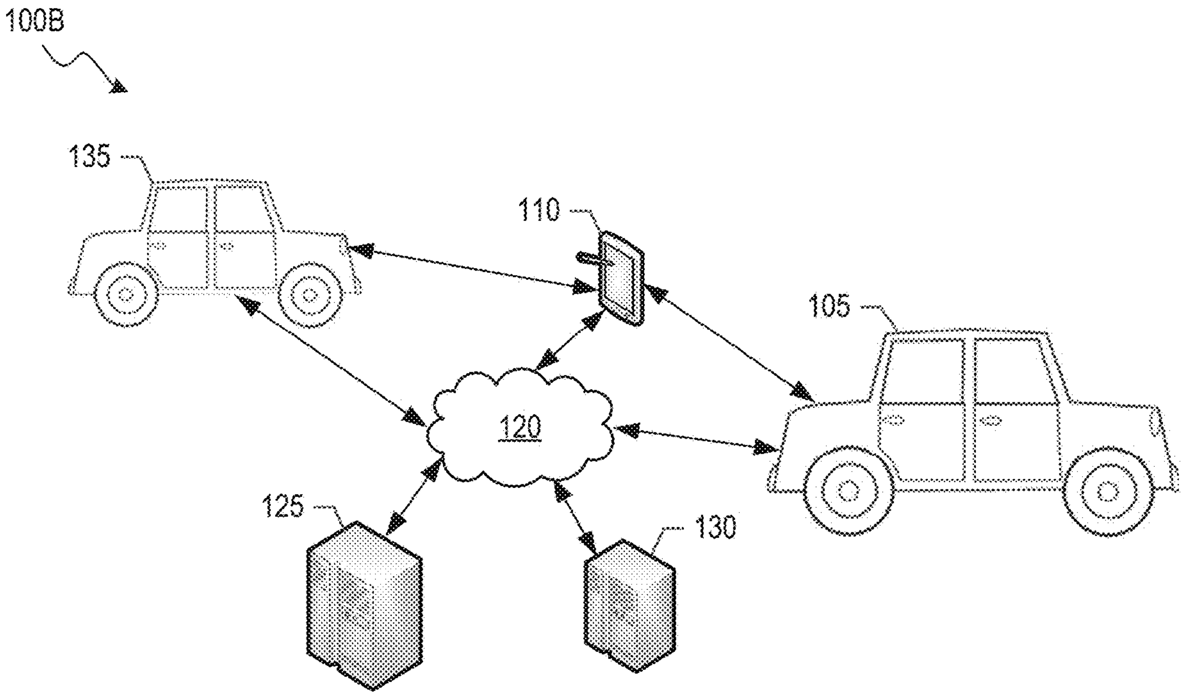

Turning now to FIG. 1B, the network environment 100B includes the vehicle 105, the user device 110, the network 120, the user profile management system 125, the activity profile management system 130, and a vehicle 135. The description of FIG. 1A generally applies to FIG. 1B, with examples of differences between FIG. 1A and FIG. 1B and other description provided herein. In an embodiment, the vehicle 135 may be implemented in the same or similar manner as the vehicle 105 of FIG. 1A.

The user device 110 may communicate with the vehicle 105 (e.g., as described in FIG. 1A) and/or the vehicle 135. In one example, the user may manually set the vehicle 105 to which the user device 110 authenticates, such as via a selection on an application of the user device 110 or directing a signal (e.g., line-of-sight infrared signal) to the vehicle. Alternatively, or in addition, in another example, the user device 110 may perform a vehicle-initiated handshake procedure with the vehicle 105 and/or 135 or a handshake procedure initiated by the user device 110, such as a handshake procedure initiated based on a distance between the vehicle 105 and the user device 110 and a distance between the vehicle 135 and the user device 110. For example, assuming successful authentication of the user device 110 to the vehicles 105 and/or 135, the vehicles 105 and/or 135 may determine whether the user device 110 has profile setting privileges for the vehicles 105 and/or 135, respectively.

To facilitate application and portability of activity profiles of the user of the user device 110, the user device 110 may store, or may have access to (e.g., via the user profile management system 125), one or more activity profiles of the user of the user device 110 that the user prefers to be applied to vehicles utilized by the user. The user device 110 may authenticate to the vehicle 105 and/or the vehicle 135. Similar to the vehicle 105, the vehicle 135 may communicate with the user profile management system 125 and/or the activity profile management system 130 to facilitate the handshake procedure and/or applying of an activity profile. The user may also have user settings to be applied to the vehicles 105 and/or 135.

The vehicles 105 and/or 135 may, but need not, store activity profiles and user settings associated with the user of the user device 110 and/or other users. In this regard, by tying the activity profiles and user settings of the user to the user device 110, the user may conveniently apply the user's activity profiles and user settings to different vehicles, such as the vehicles 105 and 135, based on which vehicle the user is currently using or intending to use. This contrast with a case in which the activity profiles and/or user settings of the user are tied primarily to the vehicles 105 and 135 themselves rather than to the user device 110, in which case the user may need to manually set the activity profile and/or user settings to apply to the vehicle 105, vehicle 135, and other vehicles on a vehicle-by-vehicle basis. In some cases, the user may associate the same activity profile with different vehicles, such that the user may apply the same activity profile to these vehicles. In other cases, the user may associate different activity profiles with different vehicles. As examples, the user may request/utilize a vehicle having a certain characteristic (e.g., larger cabin) when the user intends to apply an Audio/Video Conferencing activity profile (e.g., to better allow the cabin to accommodate for conferencing equipment and associated acoustics) and a different vehicle having a different characteristic (e.g., smaller cabin and cheaper) when the user intends to apply a Solitary Work activity profile. In some cases, the user may have a respective user setting(s) associated with each activity profile. In this manner, the user may customize a given activity profile independent from user customization of other activity profiles.

Figure 1C:
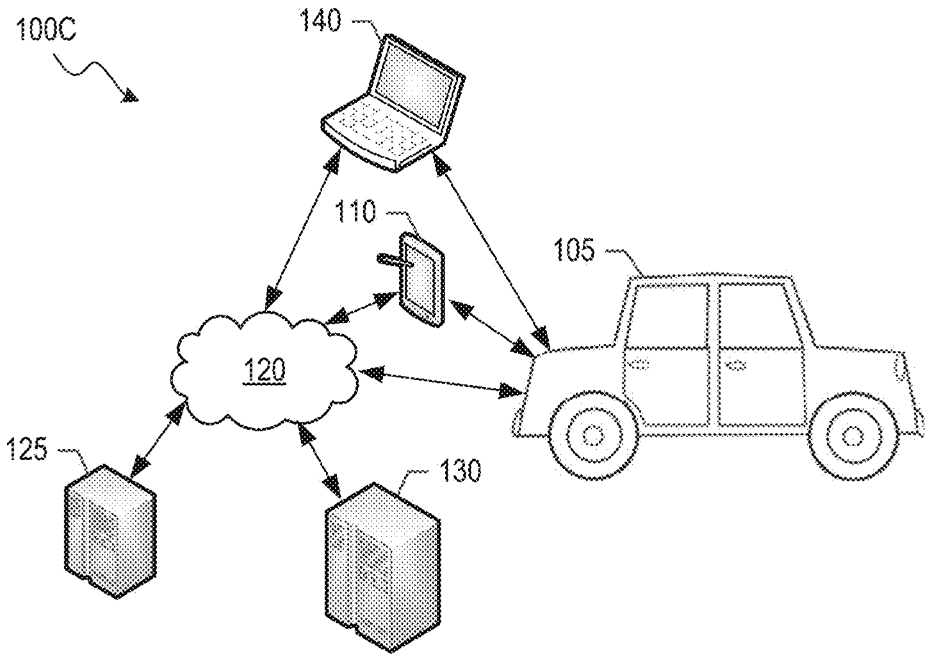

Turning now to FIG. 1C, the network environment 100C includes the vehicle 105, the user device 110, the network 120, the user profile management system 125, the activity profile management system 130, and a user device 140. The description of FIG. 1A generally applies to FIG. 1C, with examples of differences between FIG. 1A and FIG. 1C and other description provided herein. In an embodiment, the user device 140 may be implemented in the same or similar manner as the user device 110.

The vehicle 105 may perform a handshake procedure with one or both of the user devices 110 and 140. Assuming successful authentication of the user devices 110 and 140, the vehicle 105 may determine whether the user devices 110 and 140 have profile setting privileges based on an identity of a respective user of the user devices 110 and 140. For example, the vehicle 105 may access data indicative of whether the user has profile setting privileges (e.g., stored in the vehicle 105 and/or the user profile management system 125). In some cases, the same user cannot authenticate from different devices and set profiles from each device. For example, logging into the user's account from one device may bounce any other user session currently active through any of the user's other devices, such that a latest session initiated by the user prevails.

In an aspect, the vehicle 105 may determine an activity profile associated with the user that has profile setting privileges. For example, the vehicle 105 may access data indicative of the user's activity profile stored (e.g., in the vehicle 105 and/or the user profile management system 125). In some cases, the vehicle 105 may only have one user with profile setting privileges assigned at a time. This user may temporarily or permanently transfer profile setting privileges to another user. In an aspect, non-captains cannot transfer profile setting privileges but can provide their activity profile to effectuate change (e.g., change consistent with or otherwise does not disrupt application of the captain's activity profile) to a cabin of the vehicle according to their activity profile.

In another aspect, the vehicle 105 may allow multiple users to have profile setting privileges. The vehicle 105 may associate each of these captains with a different priority value. If both the user devices 110 and 140 are associated with users having profile setting privileges (e.g., both users are captains), the vehicle 105 may utilize priority values previously associated with these captains when determining whose activity profile to apply. Such priority values may be set (e.g., agreed upon) by users (e.g., captains) of the vehicle 105. In some cases, a user associated with a higher priority value may transfer profile setting privileges to a user associated with a lower priority value or no priority value (e.g., non-captain). Other manners by which different priority values may be assigned to different captains may be utilized. More generally, other manners by which a vehicle can accommodate multiple captains may be utilized.

As an example that utilizes priority values, seven different users are designated as captains of the vehicle, where each of the seven captains may be associated with a different priority value between 1 and 7, inclusive, where 1 is assigned to the captain with the highest priority and 7 is assigned to the captain with the lowest priority. In this example, when the user of the user device 110 is assigned a priority value of 2 and the user of the user device 140 is assigned a priority value of 7, the vehicle 105 applies the activity profile of the user of the user device 110. In one example, the captain assigned a priority value of 1 may be able to assign different priority values to different captains and/or the different captains may agree on the different priority values associated to each captain.

Figure 1D:
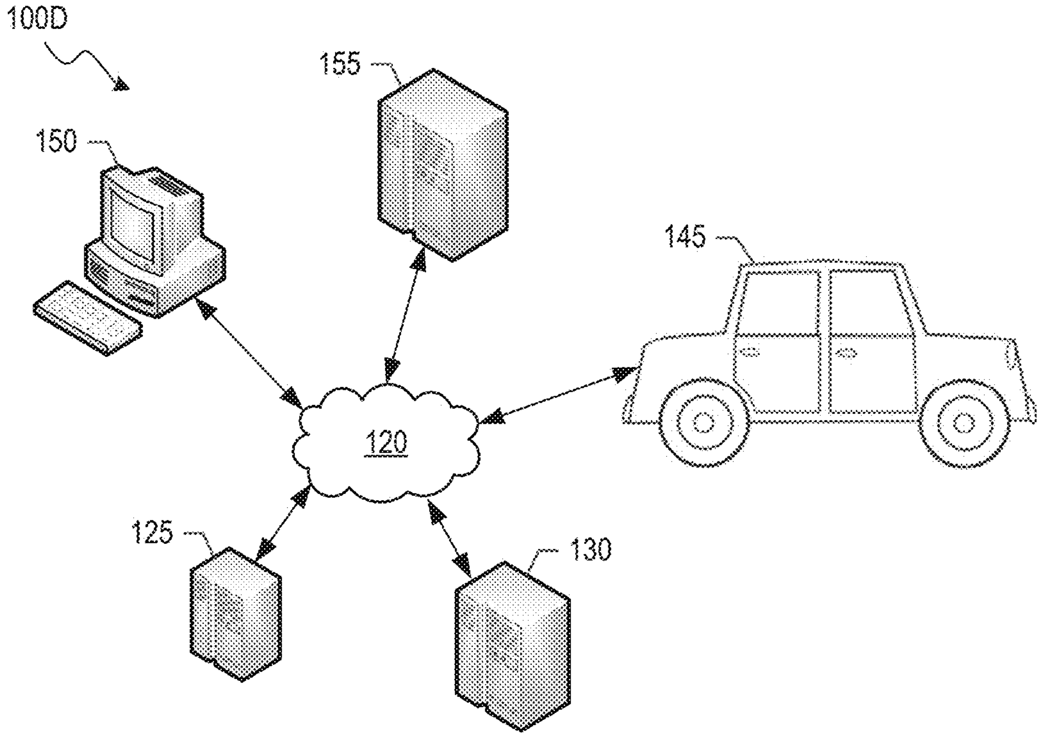

Turning now to FIG. 1D, the network environment 100D includes the network 120, the user profile management system 125, the activity profile management system 130, a vehicle 145, a user device 150, and a vehicle management system 155. The description of FIG. 1A generally applies to FIG. 1D, with examples of differences between FIG. 1A and FIG. 1D and other description provided herein. In an embodiment, the user device 150 may be implemented in the same or similar manner as the user device 110 of FIG. 1A.

The user device 150 may communicate with the vehicle management system 155 to request the vehicle 145. By way of non-limiting examples, the vehicle management system 155 may be provided by a vehicle dealership for selling and/or renting vehicles, vehicle sharing service and/or passenger/cargo fleet management service (e.g., vehicle timeshare scheduling service, vehicle hailing service), and/or other party. For instance, using the vehicle management system 155, a user of the user device 150 may buy the vehicle 145, rent the vehicle 145, or otherwise schedule use of the vehicle 145 (e.g., short-term or long-term usage of the vehicle 145 with or without ownership of the vehicle 145). In some cases, the provider of the vehicle management system 155 may also provide the user profile management system 125 and/or activity profile management system 130 and/or may otherwise operate in conjunction with or be associated with a provider of the user profile management system 125 and/or activity profile management system 130.

In an embodiment, the vehicle management system 155 may host a website and/or provide an application that provides the user with an interface for requesting a vehicle. In one case, the user device 150 may provide an activity profile to the vehicle management system 155. In another case, the vehicle management system 155 may retrieve (e.g., access) an activity profile of the user of the user device 150 from the user profile management system 125. The user device 150 may provide a selection of a vehicle, or the vehicle management system 155 may select a vehicle for the user. For explanatory purposes, the vehicle 145 is selected. The activity profile can be applied to the vehicle 145, such as prior to the vehicle 145 being picked up by or delivered to the user. In some cases, the vehicle 145 is an autonomous vehicle (e.g., unmanned vehicle). In other cases, the vehicle 145 is manually driven by a driver (e.g., associated with a ride hailing service). In some cases, the user may request multiple vehicles at a time from the vehicle management system 155 and/or other vehicle management systems, such as to facilitate an event. The event may be a stationary event, such as a lecture event or concert event, or a non-stationary event, such as a parade.

As an example, the vehicle management system 155 may provide a vehicle timeshare scheduler service, such that the user of the user device 150 may provide a request to use a vehicle during a certain timeframe. The user may specify an activity profile to apply to a vehicle. The user may be allowed to specify the specific vehicle to use during the timeframe, or the vehicle management system 155 may select the vehicle 145 for the user (e.g., based on the user's activity profile, user settings, cost preferences, and/or other parameters). For explanatory purposes, the vehicle 145 is selected. The vehicle 145 may then be delivered to the user to accommodate the user's specified timeframe. The vehicle 145 may arrive for the user's use with the activity profile and user settings applied. In one case, the user may not need to use the user device 150 or other device to perform a handshake procedure with vehicle 145. In another case, the user may use the user device 150 or other device to perform a handshake procedure, such that the vehicle 145 can verify the identity of the user of the vehicle 145. Since the user already provided the activity profile to apply to the vehicle 145 when scheduling use of the vehicle with the vehicle management system 155, the user may not need to transmit the activity profile to the vehicle 145 unless the user desires to change to another activity profile. In some cases, the user may also have provided user settings to apply to the vehicle 145, such that the user may not need to transmit these previously provided user settings to the vehicle 145.

In some cases, in FIGS. 1A-1C, the user devices 110 and/or 140 may generally be a portable electronic device (e.g., smartphone, smartwatch) to facilitate application and portability of activity profiles. In FIG. 1D, the user device 150 may be a portable electronic device (e.g., smartphone, smartwatch, tablet computer) or a less portable electronic device, such as a desktop computer, since interfacing of the user device 150 with the vehicle 145 may be primarily via the vehicle management system 155. In some cases, the user of the user device 150 may also store information pertaining to the vehicle 145 and activity profile and user settings in another user device (e.g., a smartphone) of the user.

Figure 2:
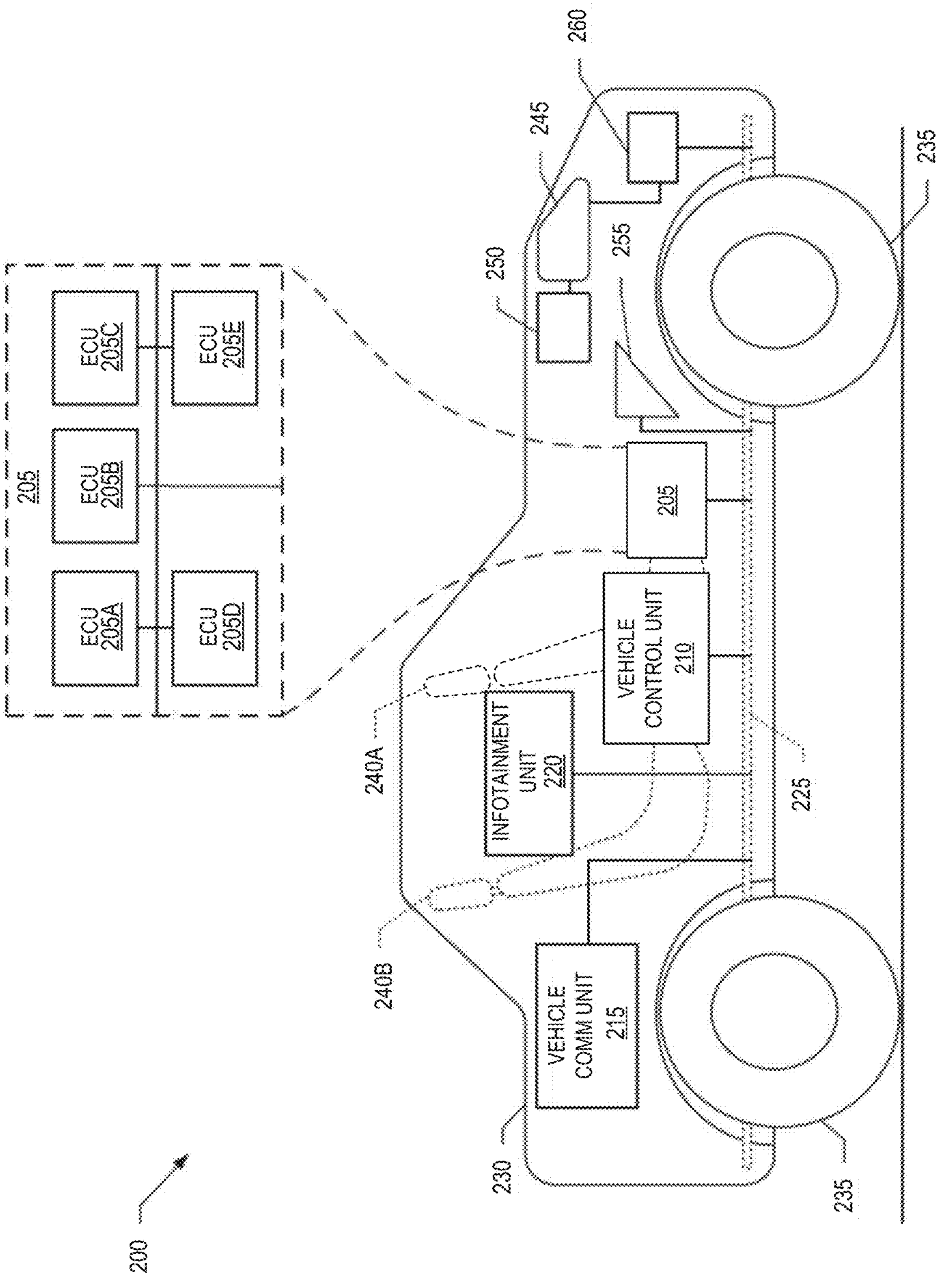
FIG. 2 illustrates an example of a vehicle in accordance with one or more embodiments of the present disclosure.

FIG. 2 illustrates an example of a vehicle 200 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. In an embodiment, the vehicle 200 may be implemented in the same or similar manner as the vehicles 105 and/or 145 of FIGS. 1A-1D. Although FIG. 2 depicts the vehicle 200 as a car, techniques described herein may generally be applied to any terrestrial vehicle, naval vehicle, and/or aerial vehicle.

The vehicle 200 includes ECUs 205 formed of ECUs 205A-E, a vehicle control unit (VCU) 210, a vehicle communication unit 215, and an infotainment unit 220 connected to and communicating via a data bus 225. The data bus 225 of the vehicle 200 may provide pathways for multiple network protocol communications (e.g., control area network (CAN), local interconnect network (LIN), media-oriented system transport (MOST), etc.). In some cases, the ECUs 205, VCU 210, vehicle communication unit 215, infotainment unit 220, and data bus 225 may collectively provide a hardware platform of the vehicle 200.

The ECUs 205 of FIG. 2 may be discrete computing devices. The ECUs 205 may include a processor (e.g., a microcontroller) to process data and execute programmable instructions (e.g., assembly level instructions, functional sequential instructions, and/or object-oriented instructions). The ECUs 205 may each include on-board memory (e.g., static random-access memory (SRAM), electrically erasable programmable read-only memory (EEPROM), and/or flash memory) to store data received and/or generated by the ECUs 205. The ECUs 205 may include input and/or output (I/O) ports such as supply voltage inputs, digital and/or analog inputs, relay drivers, H-bridge drivers, injector drivers, and/or logic outputs. These I/O ports may be used by the ECUs 205 to receive data (e.g., instructions, sensor data) and transmit signals to components (e.g., actuators, switches) to affect the components' operations based on cabin characteristics (e.g., behaviors, locations, and/or orientations) to be effectuated through application of an activity profile. The received data and/or the transmitted signals may be communicated from the ECUs 205 via the data bus 225 or through a directly wired connection between the ECUs 205 and the functional component.

In some aspects, systems (e.g., cabin, engine, cooling, suspension, etc.) of the vehicle 200 may operate within confines of operating parameters configured into the systems' corresponding ECUs 205. By way of non-limiting examples, the ECUs 205 may control cabin characteristics, engine performance, transmission, suspension brakes, tire inflation, and/or other aspects of the vehicle 200. Each of the ECUs 205 may control an individual aspect of a vehicle. In some cases, the ECUs 205 may be specialized embedded systems (e.g., small form-factor computers) that contain a processor and a memory. The ECUs 205 may accept inputs and/or produce outputs. The ECUs 205 may be given programmed instructions that can affect their output. For example, these instructions may conform to one or more automotive software architectures (e.g., automotive open system architecture (AUTOSAR) and/or manufacturer specific software architecture) corresponding to the ECUs 205.

The ECUs 205 may control operation of the vehicle 200 according to operating parameters and accept programmable instructions. The ECUs 205 may accept programmed instructions that alter the control of the corresponding vehicle system (e.g., by changing the operating parameters for that system). In some embodiments, the ECUs 205 of FIG. 2 may include cabin systems for controlling furniture control (e.g., seat position, presence of desk), temperature control, radio systems, voice controls, entertainment systems, illumination, door control, and/or other aspects of the cabin. In this regard, the cabin systems may control components (e.g., objects) associated with the cabin of the vehicle 200. To facilitate control of these components, the components and the cabin systems may be connected to the data bus 225 such that the cabin systems may communicate with (e.g., provide instructions to) these components. By way of non-limiting examples, the cabin components may include furniture or portions thereof (e.g., seats, seat cushions, tables), windows, projection screen, projection systems, power sources, light sources, audio systems, video systems, gaming systems, telecommunication systems, computing devices, air conditioning system, heating systems, and/or generally any cabin/vehicle components for affecting a cabin experience of riders of the vehicle 200. For instance, the ECU 205A may be a cabin system for controlling a first set of lights of the vehicle 200, the ECU 205B may be a cabin system for controlling a second set of lights of the vehicle, and the ECU 205C may be a cabin system for controlling an HVAC system of the vehicle.

Each of the ECUs 205 may monitor its corresponding system by reading sensor signals. These sensors may be placed on the mechanical components of the corresponding system and report factors such as a behavior (e.g., temperature for a heating system, cushion hardness for a seat, etc.), a location, and/or an orientation. These factors contribute to if, when, and/or how the ECUs 205 generates output signals to effectuate control over the corresponding system. As an example, a desk ECU may have sensors monitoring a location and an orientation of desks in the cabin of the vehicle 200. In response to an indication to adjust the location and orientation of a first desk, the desk ECU may send control signals to actuators to move and rotate the first desk as appropriate according to the indication and verify, using the sensors, that the move and rotation of the first desk are properly performed. The indication may be due to providing of an activity profile (e.g., by a captain) and/or a user setting(s) (e.g., by a captain and/or one or more other users) to the vehicle 200.

In some cases, each of the ECUs 205 may be of different size and/or complexity according to the system the individual ECU 205 is controlling. In the illustrated example, the ECUs 205 are in communication with other units of the vehicle 200 via the data bus 225. In some examples, the ECUs 205 may send and/or receive information and/or vehicle operation status (e.g., the status of the systems or components of the vehicle 200, diagnostic information, telemetry data, etc.) to/from a user device (e.g., a mobile device such as a smartphone, tablet, smartwatch, etc.) via the vehicle communication unit 215, and/or may receive information (e.g., commands, activity profiles, user settings, firmware/software updates, media files, etc.) from the user device via the vehicle communication unit 215. For example, such information may be communicated between the ECUs 205 and the user device using wireless (e.g., cellular, NFC, Wi-Fi, Bluetooth) and/or wired (e.g., USB) connections generated and/or managed by the vehicle communication unit 215.

The vehicle 200 of FIG. 2 is provided with the infotainment unit 220 that includes components such as a dashboard display, a media center, a center console display, driver accessible buttons (e.g., temperature controls, door lock controls), etc. The infotainment unit 220 may also include a data store to store media (e.g., movies, music, television programs, podcasts, etc.), system firmware, navigation data, diagnostic information, data collected by data collection systems (e.g., cameras mounted externally on the vehicle 200, weather data collection, etc.), activity profiles, user settings, etc.

The infotainment unit 220 may also function as a human machine interface that provides options to a rider of the vehicle 200 and communicates the rider's selected options to the corresponding ECU 205 and/or the VCU 210. In some cases, the infotainment unit 220 may present activity profile selection options and/or user setting options to the rider via a center console display and communicate the selected activity profile and user settings to the VCU 210. In an embodiment, a user device (e.g., the user device 110) may be utilized in place of or in addition to the infotainment unit 220, at least with regard to providing activity profile selection options and/or user setting selection options to the VCU 210.

The vehicle communication unit 215 may manage communications between the vehicle 200 and network entities via a wired and/or wireless connection (e.g., an IEEE 802.11 wireless connection, a Bluetooth connection, a cable/DSL/satellite modem, a cell tower, etc.). Network entities may include a user profile manager, an activity profile manager, a ride hailer, a vehicle seller, a car manufacturer, a telecommunication service provider, an internet service provider, a media provider, and/or other entities that may utilize or provide the vehicle 200. In some examples, the vehicle communication unit 215 may be implemented as an array of communication platforms (e.g., Bluetooth modem, NFC reader, radio frequency (RF) communication array, 4G Long-Term Evolution (LTE), Global System for Mobile Communications (GSM) modem, etc.). The vehicle communication unit 215 may maintain network information (e.g., a network address, network settings, etc.) for sending and/or receiving data over various communication platforms using various communication protocols. The vehicle communication unit 215 may manage the connections between the vehicle 200 and outside entities (e.g., a Bluetooth connection between a user device and the VCU 210). In some examples, the vehicle communication unit 215 may establish communicative connections with different network entities (e.g., a car manufacturer, a telecommunication service provider, an internet service provider, a media provider, etc.) to send data from the vehicle 200 to the network entities and/or receive data from the network entities for delivery to the vehicle 200 (e.g., activity profiles). In addition, the vehicle communication unit 215 may communicate with a computing device, such as a personal electronic device (e.g., a smartphone, a tablet, a smart watch, etc.), a personal computer (e.g., a desktop, a laptop, etc.), a diagnostic computer (e.g., at a dealership, etc.), etc. In some examples, one or more computing devices connected to the vehicle 200 via the vehicle communication unit 215 may transmit and receive information, such as vehicle diagnostic data, media files (e.g., movies, music, television programs, etc.) uploaded to a memory of the vehicle 200, firmware and/or software updates, activity profiles, user settings, etc.

The VCU 210 may be implemented by any device accompanying software that accepts, processes, and/or transmits data within a vehicular information network (e.g., the data bus 225). The VCU 210 is in communication with other components of the vehicle 200, such as the ECUs 205, the vehicle communication unit 215, and the infotainment unit 220, via the data bus 225. In FIG. 2, the VCU 210 acts as the controller of the ECUs 205 in the vehicle 200. In some aspects, the VCU 210 may include a cabin systems controller that instructs the ECUs 205 of the vehicle 200 to adjust a behavior, a location, and/or an orientation of an object in the cabin of the vehicle 200 according to an activity profile and/or a user setting(s) provided by the user to the vehicle 200.

In some cases, the VCU 210 may receive activity profiles and/or user settings via the vehicle communication unit 215. For example, the VCU 210 may store activity profiles and/or user settings or may have access to activity profiles and/or user settings stored in the vehicle 200. The activity profiles stored in the vehicle 200 may include those that can be applied to (e.g., are compatible with) the vehicle 200. In some cases, the activity profiles stored in the vehicle 200 may include those that cannot be applied to (e.g., are not compatible with) the vehicle 200 (e.g., with an indication of the lack of compatibility with the activity profiles also stored in the vehicle 200). The activity profiles that can be applied to the vehicle 200 may be determined as part of manufacturing the vehicle 200 or post-manufacturing.

For example, the VCU 210 may be in communication with (e.g., via the vehicle communication unit 215) a server (e.g., the activity profile management system 130) storing activity profiles. Data describing available activity profiles at the server may be collected by the VCU 210. Such data may be presented via a display of the infotainment unit 220 and/or a user device. The user device may have stored activity profiles of the vehicle 200 via a mobile application in communication with a server (e.g., the activity profile management system 130) storing the activity profiles. The activity profile (and/or user settings) selected via the infotainment unit 220 or the user device may be transmitted to the VCU 210. In some cases, such as when the activity profile is provided by the user device, the VCU 210 may access data stored in the vehicle 200 and, if needed, access the server (e.g., the activity profile management system 130) to determine whether the activity profile can be applied to the vehicle 200. For example, the vehicle 200 may access the server via a mobile application installed in the vehicle 200. In this regard, the VCU 210 may determine if a selected activity profile is stored locally and, if the selected activity profile is not stored locally, the VCU 210 may request and/or obtain the selected activity profile from the remote server.

The VCU 210 provides instructions to one or more of the ECUs 205 based on the activity profiles, such as when transitioning from applying one activity profile to the vehicle 200 to applying another activity profile to the vehicle 200. Each transition may be associated with a different cabin configuration of the vehicle 200. In this regard, when the instructions have been executed to change cabin characteristics of the vehicle 200 according to the newly applied activity profile, the vehicle 200 has a different cabin configuration. In some cases, when the activity profile has been successfully applied, the vehicle 200 may indicate to the user that the activity profile has been successfully applied. For example, the vehicle 200 may display a textual and/or pictorial indication on a console display provided in the vehicle 200 and/or transmit the textual and/or pictorial indication to the user's device (e.g., for display by the user's device). The VCU 210 may also provide instructions to one or more of the ECUs 205 based on a user setting(s). In some cases, the user setting(s) may be considered user adjustments to a baseline provided by a predetermined activity profile. In some cases, when the activity profile has been successfully applied, the vehicle 200 may indicate to the user that the user setting(s) has been successfully applied.

In some aspects, a user may provide settings to indicate which indications/notifications the vehicle 200 provides to the user. As an example, the user may provide settings to indicate that the vehicle 200 sends a message to indicate whether an activity profile and certain types of user settings have been successfully applied and not send a message to indicate whether other types of user setting have been successfully applied. For instance, the user may indicate that the vehicle 200 sends a message to the user regarding whether an adjustment to a setup of a videoconferencing system of the vehicle 200 has been successfully applied, but not send a message to the user regarding whether an adjustment of a position of a seat of the vehicle 200 has been successfully applied.

In the illustrated example of FIG. 2, the vehicle 200 includes a body 230, wheels 235, seat 240A and 240B, a motor 245, a HVAC system 250, and a transmission 255. The body 230 covers an exterior of the vehicle 200 to protect and/or contain the other parts of the vehicle 200. In one example, the ECU 205A controls lighting systems, ECU 205B controls seat positions, ECU 205C controls the HVAC system 250, and ECU 205D controls braking systems. The motor 245 may be implemented by a combustion engine, a direct current (DC) electric motor, and/or an alternating current (AC) electric motor. The motor 245 may be communicatively coupled to the ECU 205E and the transmission 255. The ECU 205E may receive operating power from batteries 260 to control components of the motor 245 (e.g., throttle valve, sparkplugs, pistons, fuel injectors, etc.). The ECU 205E may receive signals from a driver (e.g., via sensors in a pedal, etc.) to determine corresponding control signals to communicate to the motor 245 (e.g., manipulating throttle valve, firing spark plugs, altering fuel injection quantities, etc.). The motor 245 may supply torque to the transmission 255 to drive two or more wheels 235. In this example, the ECUs 205A-C may be referred to as cabin systems. The vehicle 200 may have additional ECUs not shown in FIG. 2.

Figure 3A:
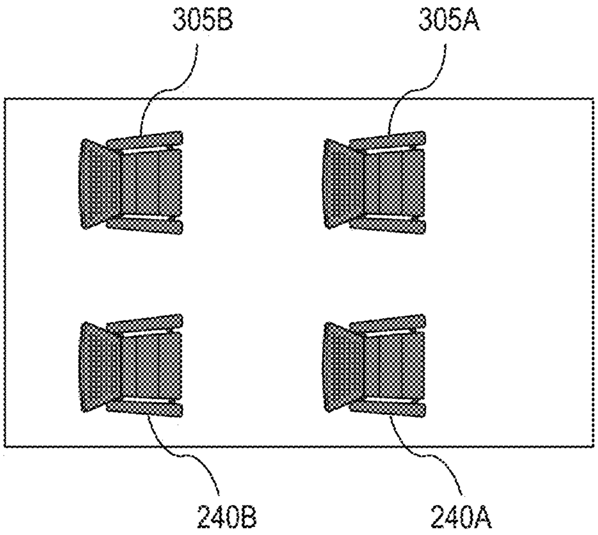
FIGS. 3A through 3H illustrate example cabin configurations associated with various activity profiles in accordance with one or more embodiments of the present disclosure.

FIGS. 3A through 3F illustrate example cabin configurations associated with different activity profiles in accordance with one or more embodiments of the present disclosure. In particular, FIGS. 3A through 3F illustrate top-down views of the example cabin configurations. For explanatory purposes only, the cabin configurations are for a cabin of the vehicle 200 of FIG. 2. In FIG. 3A, an example of a cabin configuration for a Conventional Ride activity profile is provided. The cabin configuration includes the seats 240A and 240B and seats 305A and 305B, with each of the seats 240A, 240B, 305A, and 305B facing forward. The Conventional Ride activity profile may allow riders to experience a conventional ride in which each rider may look ahead through the windshield and/or the side windows. In some cases, the Conventional Ride activity profile may be utilized as a default activity profile when none of the captains have expressed a desired, specific activity to facilitate performance of during navigation of the vehicle 200 and/or while the vehicle 200 is stationary. In this regard, in some cases, the Conventional Ride activity profile may be set as a default activity profile in the case that no captains provide an activity profile to apply to the vehicle 200.

Figure 3B:
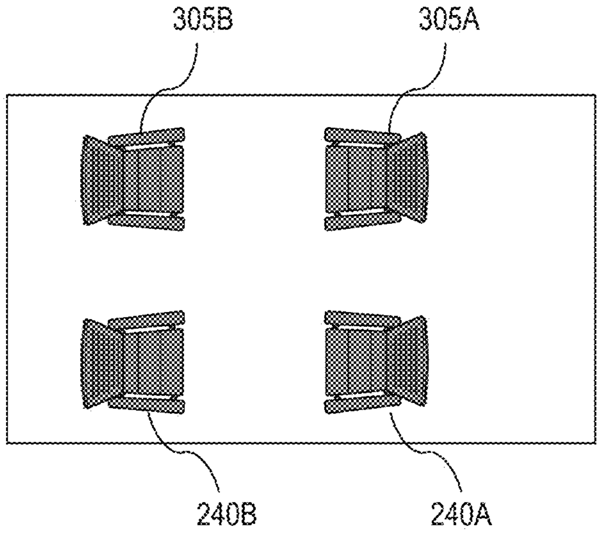

In FIG. 3B, an example is provided of a cabin configuration for a Conversation activity profile. Relative to the cabin configuration of FIG. 3A, the cabin configuration of FIG. 3B has the seats 240A and 305A rotated so that they face the seats 240B and 305B. As an example, in transitioning from the cabin configuration of FIG. 3A to that of FIG. 3B, a cabin systems controller (e.g., of the VCU 210) may generate instructions to ECUs (e.g., one or more of the ECUs 205) to cause rotational and, if needed, translational movement of the seats 240A and 305A. In the examples provided in FIGS. 3A and 3B, the seats 240B and 305B remain stationary, although in other examples the seats 240B and 305B may be moved and/or rotated. The Conversation activity profile facilitates riders having a conversation with each other. For instance, in FIG. 3A, riders in the seats 240A and 305A may have to turn their head around to talk to riders in the seats 240B and 305B, which may cause discomfort to the riders in the seats 240A and 305A.

Figure 3C:
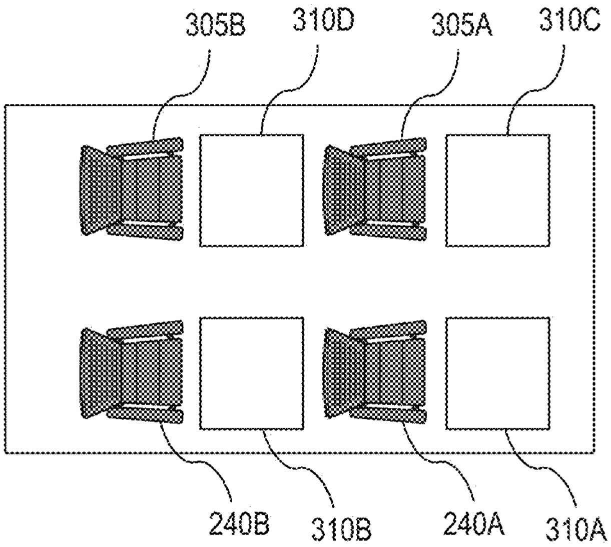

In FIG. 3C, an example is provided of a cabin configuration for a Solitary Dining activity profile. Relative to the cabin configuration of FIG. 3A, the cabin configuration of FIG. 3C has desks 310A, 310B, 310C, and 310D positioned in front of the seats 240A, 240B, 305A, and 305B, respectively. For instance, the desks 310A-D may be stowed in the cabin configuration of FIG. 3A to avoid cluttering the cabin of the vehicle 200 when riders of the vehicle 200 have not expressed an intent to use the desks 310A-D. As an example, in transitioning from the cabin configuration of FIG. 3A to that of FIG. 3C, a cabin systems controller (e.g., of the VCU 210) may generate instructions to ECUs (e.g., one or more of the ECUs 205) to cause appropriate rotational and/or translational movement (e.g., using actuators, rails, etc.) to transition the desks 310A-D out of a stowed state to position the desks 310A-D as shown in FIG. 3C. In some cases, while the positions and orientations of the seats 240A-B and 305A-B remain the same between FIGS. 3A and 3C, a position and/or an orientation of one or more of the seats 240A-B and 305A-B may be temporarily adjusted as appropriate to accommodate positioning of the desks 310A-D. Such adjustment may maximize or at least partially take into consideration passenger comfort.

In an example case of the Solitary Dining activity profile, riders may not know each other and/or may have their own activity to perform during travel time on the vehicle 200. For example, the vehicle 200 may be provided by a ridesharing service where, during the evening, the Solitary Dining activity is applied to the vehicle 200 to allow any riders of the vehicle 200 to have a desk in front of them to facilitate dining or other activity during travel time. Riders may enter the vehicle 200 at different locations and may have bought a meal for consumption on the vehicle 200. Instead of the Solitary Dining activity profile, the arrangement of the seats 240A-B and 305A-B and the desks 310A-D of FIG. 3C may be for a Solitary Work activity profile. In some cases, for the Solitary Work activity profile, a computing device may be provided (e.g., transported from a stowed state onto a desk and powered on) on each of the desks 310A-D.

Figure 3D:
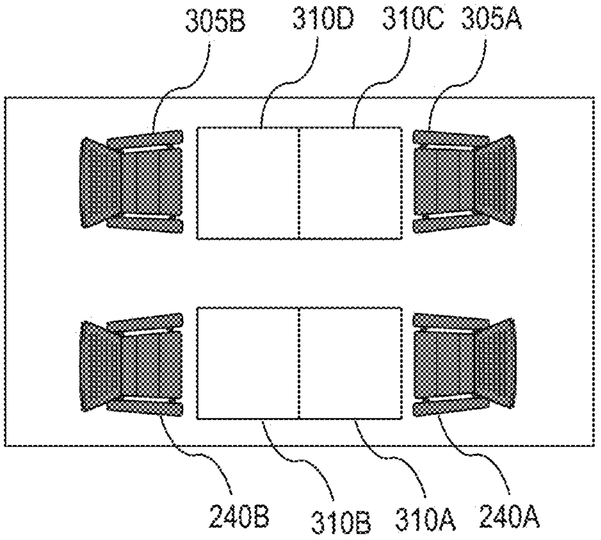
Figure 3E:
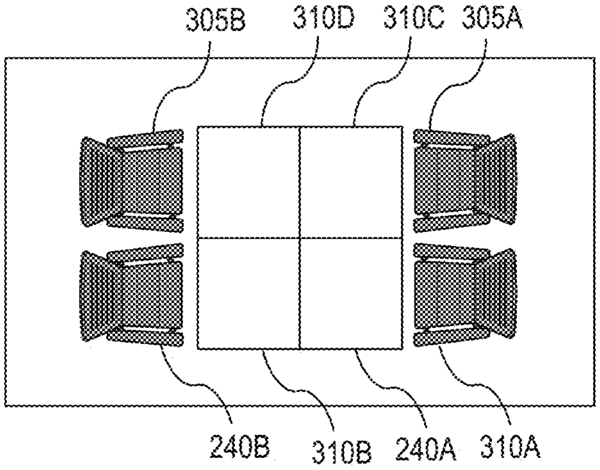

In FIG. 3D, an example is provided of a cabin configuration for a Group Dining activity profile. Relative to the cabin configuration of FIG. 3C, the cabin configuration of FIG. 3D has the desks 310A and 310B moved in proximity to and, in some cases, abutting each other; the desks 310C and 310D moved in proximity to and, in some cases, abutting each other; and the seats 240A and 305A rotated to face the seats 240B and 305B. The Group Dining activity profile facilitates riders interacting with each other while having a meal. In FIG. 3E, another example is provided of a cabin configuration for the Group Dining activity profile. Instead of the Group Dining activity profile, the arrangement of the seats 240A-B and 305A-B and the desks 310A-D of FIGS. 3D and 3E may be for a Group/Collaborative Work activity profile. In some cases, for the Group/Collaborative Work activity profile, one or more computing devices may be provided (e.g., positioned and powered on) on the desks 310A-D and/or one or more projection screens may be provided in the cabin. The computing device(s) may, but need not, be shared by the riders.

Figure 3F:
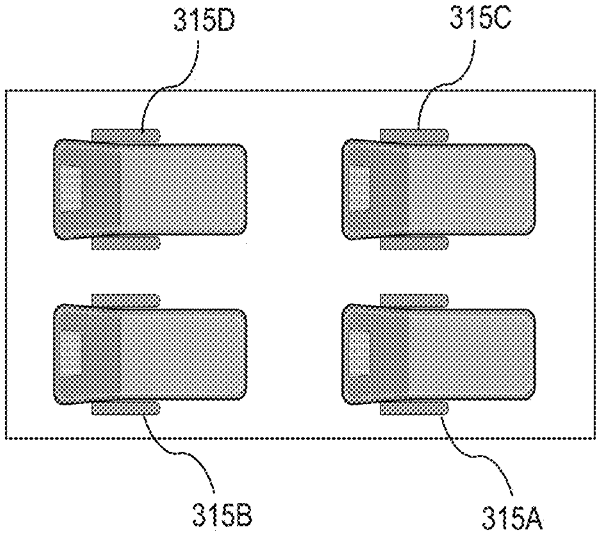

In FIG. 3F, an example is provided of a cabin configuration for a Rest & Relaxation activity profile. The cabin configuration includes lounge chairs 315A-D. In one example, with reference to FIGS. 3C and 3F, the lounge chair 315A may be formed by reclining the seat 240A, lowering the desk 310A, and positioning the desk 310A in proximity to the seat 240A. Similarly, the lounge chairs 315B, 315C, and 315D may be formed by reclining the seats 240B and 305A-B, lowering the desks 310B, 310C, and 310D, respectively, and positioning the desks 310B, 310C, and 310D in proximity to the seats 240B, 305A, and 305B, respectively. In another example, the seats 240A-B and 305A-B may each have a leg rest that can be raised to form the lounge chairs 315A-D. In yet another example, the lounge chairs 315A-D may be separate pieces of furniture from the seats 240A-B and 305A-B and the desks 310A-D. To avoid clutter in the cabin, the seats 240A-B and 305A-B and the desks 310A-D may be stowed (e.g., automatically stowed) when the lounge chairs 315A-D are positioned in the cabin for riders' use. In an aspect, automatic stowing may refer to stowing that is performed without user intervention. In this regard, the user may request application of an activity profile that causes an adjustment to a cabin characteristic. The vehicle 200 receives the requested activity profile and adjusts the cabin configuration accordingly, including automatically stowing unneeded/unused objects (e.g., furniture, devices) in the cabin as appropriate, without user intervention. Automatic stowing may also be referred to as programmatic stowing, since the vehicle 200 executes appropriate instructions programmed into the vehicle 200 to stow unneeded/unused objects in the cabin without user intervention to facilitate providing of a desired cabin configuration.

Figure 3G:
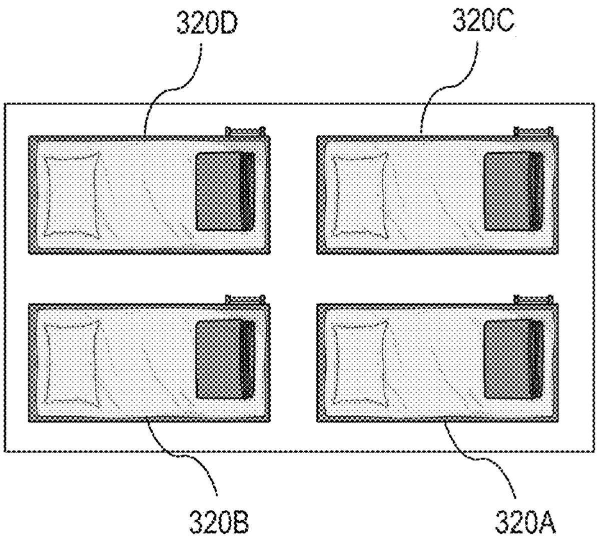

In FIG. 3G, an example is provided of a cabin configuration for a Sleep activity profile. The cabin configuration includes beds 320A-D. In one example, with reference to FIGS. 3C and 3G, the bed 320A may be formed by reclining the seat 240A (e.g., to a lying down position), lowering the desk 310A to align with a height of the seat 240A (after reclining), and positioning the desk 310A in proximity to the seat 240A. The beds 320B-D may be formed in a similar manner using respective seat and desk. In another example, the desks 310A-D may be stowed and the seats 240A-B and 305A-B may be reclined (e.g., to a lying down position) to form the beds 320A-D. In yet another example, the beds 320A-D may be separate pieces of furniture from the seats 240A-B and 305A-B and the desks 310A-D. To avoid clutter in the cabin, the seats 240A-B and 305A-B and the desks 310A-D may be stowed (e.g., automatically stowed) when the beds 320A-D are positioned in the cabin for riders' use. It is noted that regardless of activity profile, such as the Sleep activity profile, the vehicle 200 provides safety mechanisms (e.g., safety belts, airbags) for use by the riders during navigation in the vehicle 200.

Figure 3H:
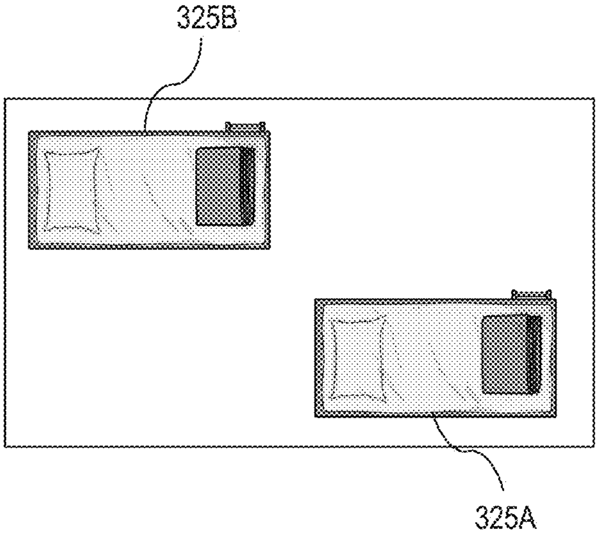

In FIG. 3H, another example is provided of a cabin configuration for the Sleep activity profile. The cabin configuration includes beds 325A and 325B. In one case, while the cabin of the vehicle 200 may have space to accommodate the seats 240A-B and 305A-B and the desks 310A-D, the cabin only has enough space to safely accommodate the beds 325A and 325B. In this case, the Sleep activity profile may accommodate two riders whereas various other activity profiles (e.g., those not involving beds) may accommodate up to four riders. In one example, with reference to FIGS. 3D and 3H, the bed 325A may be formed by reclining the seat 240A (e.g., to a lying down position) and raising its leg rest to align with the reclined seat 240A. Similarly, the bed 325B may be formed by reclining the seat 305A and raising its leg rest to align with the reclined seat 305A. In another example, the bed 325A may be formed by flipping the desks 310A and 310B of FIG. 3D, and the bed 325B may be formed by flipping the desks 310C and 310D. To avoid clutter in the cabin, various components of the cabin may be stowed when the beds 325A and 325B are positioned in the cabin for riders' use.

Figure 4A:
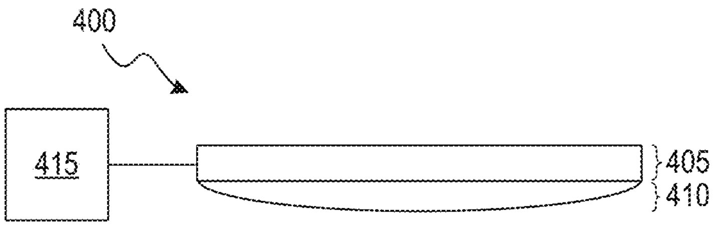
FIGS. 4A and 4B illustrates example orientations of a piece of furniture in accordance with one or more embodiments of the present disclosure.
Figure 4B:
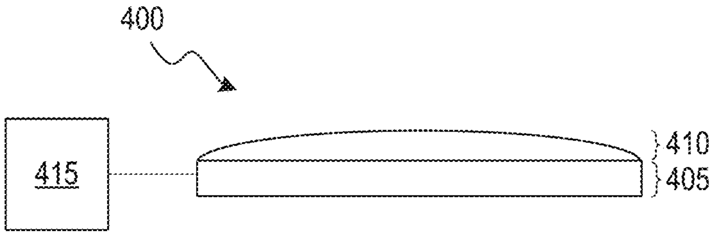

Pieces of furniture provided in the cabin may be transformed for use in various activity profiles. For example, FIGS. 4A and 4B illustrates example orientations of a piece of furniture 400 in accordance with one or more embodiments of the present disclosure. In FIG. 4A, the piece of furniture 400 is oriented such that a flat portion 405 faces a roof of the vehicle 200 and a rounded portion 410 faces a floor of the vehicle 200. In FIG. 4B, the piece of furniture 400 is oriented such that the flat portion 405 faces the floor and the rounded portion 410 faces the roof. The orientation of FIG. 4A may allow the piece of furniture 400 to be utilized as a desk. The orientation of FIG. 4B may allow the piece of furniture 400 to be utilized as a bed (or portion thereof). In some cases, the rounded portion 410 may be softer than the flat portion 405. The orientation of the piece of furniture 400 of FIG. 4A is flipped relative to the orientation of the piece of furniture 400 of FIG. 4B. In some cases, to transition from the orientation of FIG. 4A to FIG. 4B, or vice versa, a cabin systems controller (e.g., of the VCU 210) may generate instructions to ECUs (e.g., one or more of the ECUs 205) to cause appropriate rotational and possibly translational movement using one or more components 415, such as actuators, poles, rails, and/or other components, to rotate (e.g., flip) and possibly move the piece of furniture 400. The component(s) 415 may be referred to as a cabin characteristic adjustor(s). The component(s) 415 may be controlled using a cabin system, which in turn may be controlled using instructions from a cabin systems controller.

In an example different from the piece of furniture 400 of FIGS. 4A and 4B, which is flipped to provide a desk or a bed, a piece of furniture may be utilized as a desk, a bed, or other furniture type without needing to be flipped. This piece of furniture may include a cushion that can be inflated (e.g., using a pump provided by the vehicle 200) by an appropriate amount for providing a seat, a bed, a surface for a desk, a surface for a dining table, or other furniture type. In some cases, the user may set a respective amount by which to inflate the cushion for each of various types of furniture or furniture surfaces to be provided by a piece of furniture.

Although the cabin configurations of FIGS. 3A through 3F illustrate seats, desks, and objects derivable from the seats and desks, the cabin configurations may include other components not shown in FIGS. 3A through 3F and that may be provided and/or adjusted as appropriate according to cabin characteristics of a given activity profile. By way of non-limiting examples, the cabin configurations may include other components such as lights, computing devices, audio devices (e.g., microphones, speakers), projection screens, network devices, hot spots, augmented reality (AR)/virtual reality (VR) capabilities, television screens, etc. In some cases, rather than deriving a bed from a seat and a desk, a cabin of a vehicle may be sufficiently large to include a bed, a seat, and a desk. In one example, the seat, desk, and bed may be in the cabin and appropriately positioned and oriented according to the applied activity profile. In another example, the seat and desk may be stowed when the bed is in use and, similarly, the bed may be stored when the seat and/or desk is in use.

Figure 5A:
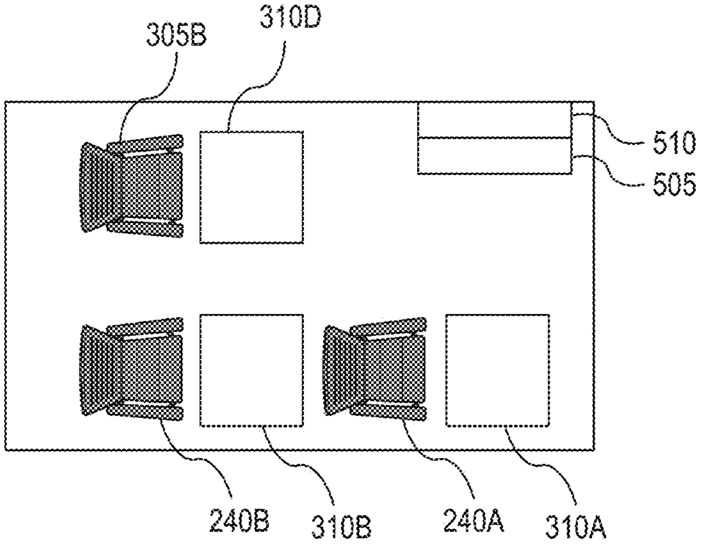
FIGS. 5A, 5B, and 5C illustrate the cabin configuration of FIG. 3C adjusted to stow various pieces of furniture in accordance with one or more embodiments of the present disclosure.
Figure 5B:
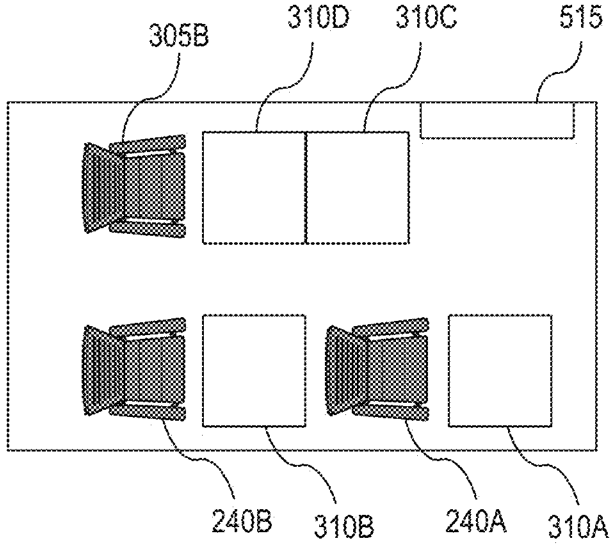
Figure 5C:
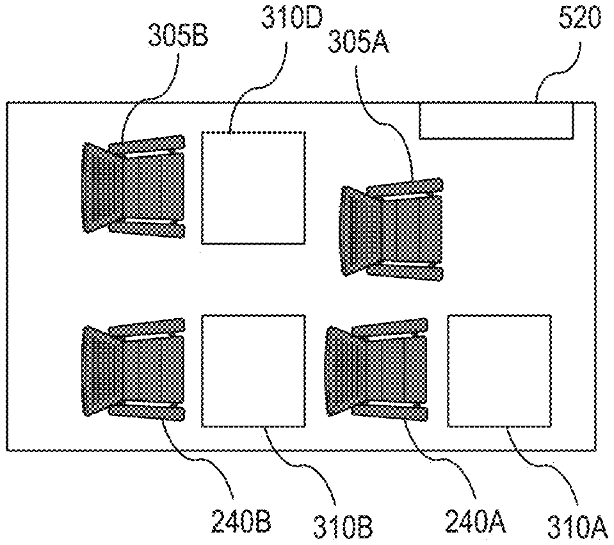

In general, when an object in the cabin is not utilized, the object can be stowed (e.g., automatically/programmatically stowed) to avoid cluttering the cabin of the vehicle 200. The object may be stowed in the cabin or, to further reduce cluttering of the cabin, outside the cabin. For example, the object can be securely attached outside the vehicle 200, such as on the roof of the vehicle 200, on an outside side or back surface of the vehicle 200, in a cabin storage area, and so forth. The cabin storage may include any space dedicated for storing unneeded/unused cabin objects (e.g., furniture, computing devices, audio devices) or otherwise any space available that can safely store unneeded/unused objects such that these objects do not clutter the cabin of the vehicle 200. For instance, the cabin storage may include a space under the cabin floor. As examples, FIGS. 5A and 5B illustrate the cabin configuration of FIG. 3C adjusted to accommodate up to three riders rather than up to four riders, in accordance with one or more embodiments of the present disclosure. In particular, in FIG. 5A, the seat 305A and the desk 310C are stowed (depicted as a stowed seat 505 and a stowed desk 510). In FIG. 5B, the seat 305A is stowed (depicted as a stowed seat 515) and the desk 310C is moved to abut the desk 310D. Abutting the desks 310C and 310D may effectively provide a rider of the seat 305B a larger desk. For instance, when the vehicle 200 is configured to accommodate up to three riders, the rider of the seat 305B may provide a user setting to the vehicle 200 to request a larger desk. As another example, FIG. 5C illustrates the cabin configuration of FIG. 3C adjusted to stow the desk 310C (depicted as a stowed desk 520). For example, a rider seated in the seat 305A may provide a user setting to the vehicle 200 to stow the desk 310C (e.g., when the rider does not need the desk 310C and would prefer the desk 310C to not clutter the cabin of the vehicle 200).

Figure 6A:
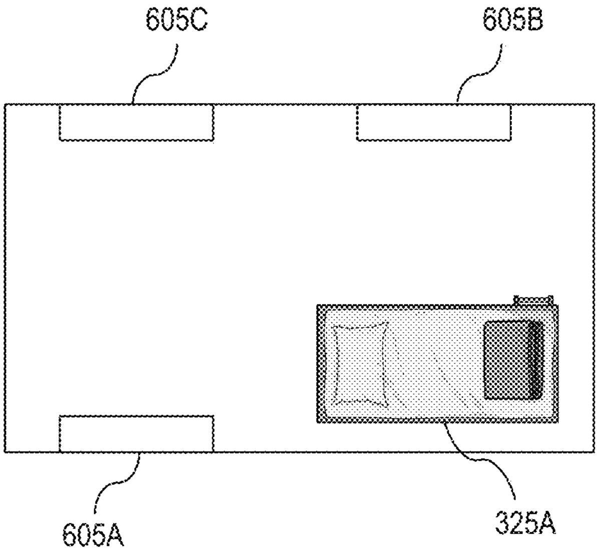
FIG. 6A illustrates the cabin configuration of FIG. 3G adjusted to accommodate a single rider, in accordance with one or more embodiments of the present disclosure.
Figure 6B:
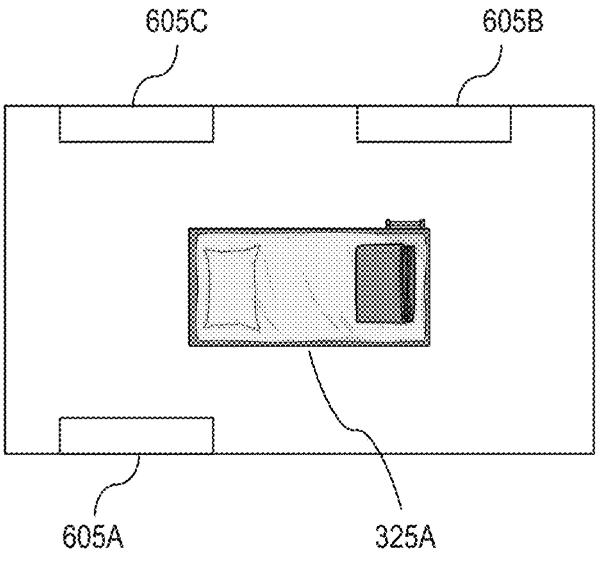
FIG. 6B illustrates the cabin configuration of FIG. 6A with a piece of furniture moved to a different position.

As a further example, FIG. 6A illustrates the cabin configuration of FIG. 3G adjusted to accommodate a single rider rather than up to four riders, in accordance with one or more embodiments of the present disclosure. In particular, in FIG. 6A, the beds 325B, 325C, and 325D are stowed (depicted as stowed beds 605A, 605B, and 605C, respectively). In some cases, when the bed 325B is formed from the seat 240B and the desk 310B, the bed 325C is formed from the seat 305A and the desk 310C, and the bed 325D is formed from the seat 305B and the desk 310D, the beds 325B-D may be formed first and then stowed. Alternatively, the stowed beds 605A may represent the seat 240B and the desk 310B after they have been stowed and/or similarly for the stowed beds 605B and 605C. As another example, FIG. 6B illustrates the cabin configuration of FIG. 6A with the bed 325A moved toward a center of the cabin of the vehicle 200. Such positioning of the bed 325A toward the center of the cabin may provide the rider with a perception of a larger cabin, relative to the case of FIG. 6A in which the bed 325A is at a corner of the cabin. The bed 325A may be moved toward the center of the cabin by default when the vehicle 200 only needs to accommodate a single rider or in response to a user setting from the single rider to move the bed 325A.

It is noted that FIGS. 3A-3H, 5A, 5B, 6A, and 6B provide examples of cabin configurations and associated activity profiles. Different cabin configurations may be implemented. For a given activity profile, a user may provide a user setting(s) to effectuate an adjustment of the cabin configurations to suit the user's preferences. Further in this regard, whereas FIGS. 3A-3H, 5A, 5B, 6A, and 6B illustrate a vehicle that accommodates up to four riders, in other vehicles, fewer or more than four riders can be accommodated (e.g., based at least on a size of a vehicle and its cabin).

Additional examples of cabin transformation based on a rider's travel preference are provided herein. For example, when the preference while traveling is a meeting, a Meeting activity profile may be applied. A cabin systems controller may configure the environment to be best suited for a meeting. Furniture may be adjusted to provide a desk and seating around the table. Lighting may be set so that all attendees may see the meeting space and each other, with each attendee in a cabin of a vehicle being in control of their own light source. All audio programming may be silenced to provide a quiet environment to support the meeting. Heating/cooling may be set to a comfortable level to allow attendees in the cabin to relax and focus on the meeting. A projection screen may be made available for sharing content during a meeting. Communication and conferencing services may be made available to allow non-local participants (e.g., people not in the cabin of the vehicle) to join the meeting and record the meeting if there is a need to do so. Each attendee may have a local Wi-Fi connection so that they maintain full connectivity during the meeting while traveling to a destination. A vehicle concierge may take voice commands to customize the cabin further to the riders' preferences. In this case, user setting(s) may be provided as voice commands.

As another example, when the purpose preference while traveling is a Watch Content activity profile, the cabin systems controllers may configure the environment best suited for entertainment. Furniture (e.g., car seats) may be transformed into a comfortable couch with an ottoman. A high-resolution television (TV) screen may be made available to watch content through the vehicle's wireless connectivity. Further, side tables may be made available for placing snacks for consumption. Sound may be piped through various surround-sound and well-positioned speakers to create a theater-like experience. Lights may be dimmed to suit watching of content and a remote control may enable a rider(s) to control content to watch during travel. As such, application of the Watch Content activity profile on the vehicle may provide an environment akin to a living room while the rider(s) travel to the destination.

Figure 7:
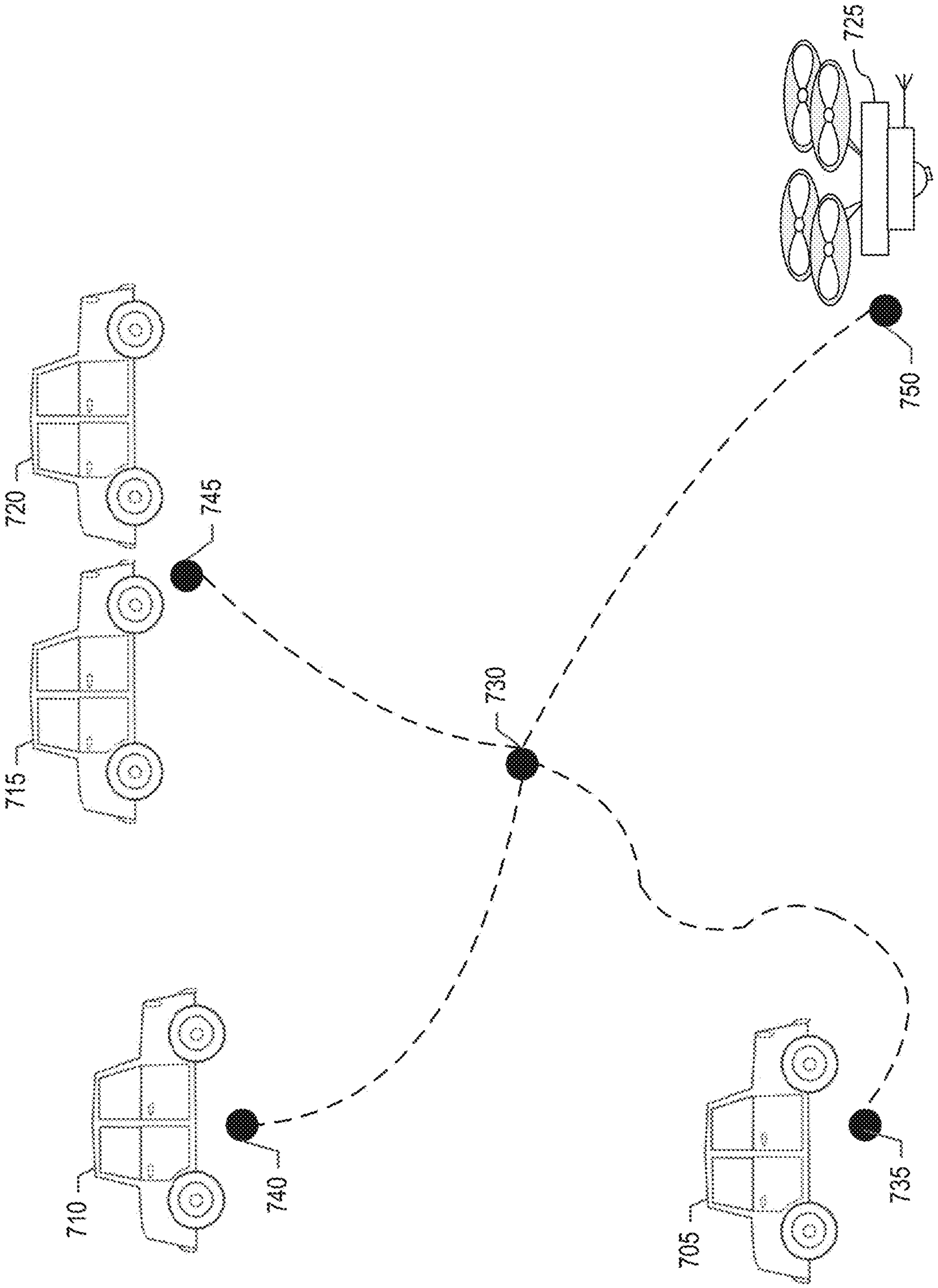
FIG. 7 illustrates an example of an environment to facilitate an event using vehicles in accordance with one or more embodiments of the present disclosure.

In some aspects, one or more users may request a plurality of vehicles and set each vehicle to a respective activity profile to facilitate coordination of an event. FIG. 7 illustrates an example of an environment to facilitate an event using vehicles 705, 710, 715, 720, and 725 in accordance with one or more embodiments of the present disclosure. In FIG. 7, the vehicles 705, 710, 715, and 720 are cars and the vehicle 725 is an aerial vehicle. The vehicles 705, 710, 715, 720, and 725 may travel to a common destination point 730. For instance, the common destination point 730 may be a location of the event. The vehicle 705 travels from a starting point 735 to the common destination point 730, the vehicle 710 travels from a starting point 740 to the common destination point 730, the vehicles 715 and 720 travel from a starting point 745 to the common destination point 730, and the vehicle 725 travels from a starting point 750 to the common destination point 730. In some cases, an activity profile of one or more of the vehicles 705, 710, 715, 720, and 725 may be unimportant until the vehicle(s) has reached the common destination point 730. In other cases, an activity profile may be important even prior to reaching the common destination point 730. For example, the activity profile of the vehicle 725 may need to be appropriately set to accommodate transportation of payload (e.g., video recording equipment) to be used at the event. At the destination point 730, the vehicle(s) may form a unified event environment suited for an event at hand, such as a concert event, lecture event, comedy event, dance performance, drive-in movie, parade, or generally any stationary event or non-stationary event. As an example, for a non-stationary event such as a parade, the destination point 730 may be a starting location of a parade route.

Each of the vehicles 705, 710, 715, 720, and 725 may be provided by one or more providers, such as an owner of a vehicle, a ride sharing service, an event coordinator service, and/or others. Once the event has ended, the vehicles 705, 710, 715, 720, and 725 may leave the common destination point 730 and embark to a next destination point, which may, but need not be, their respective starting points. In some cases, one or more users may manually select vehicles and associated activity profiles and user setting(s) to use for facilitating the event. In other cases, one or more of the vehicles and associated activity profiles and user setting(s) may be automatically selected in response to an indication from a user(s) of a type of event to be facilitated.

As a non-limiting example, the event may be a lecture event. One or more users (e.g., a lecturer, a listener, a coordinator) may request a plurality of vehicles and set each vehicle to a respective activity profile. In this example, one vehicle (e.g., the vehicle 705) may have applied an appropriate activity profile (e.g., a Speaker activity profile) and a user setting(s) to facilitate speaking by a speaker of the lecture event, such as an activity profile and user setting(s) to provide a podium(s) and a microphone(s) for use by a speaker(s). For this vehicle, the activity profile prior to reaching the common destination point 730 may be unimportant for purposes of the event itself. Other vehicles (e.g., the vehicles 710, 715, and 720) may have applied an appropriate activity profile (e.g., a Listener activity profile) and a user setting(s) to facilitate interaction between the listeners and the speaker(s), such as an activity profile and a user setting(s) to provide to provide a seat(s), a sound speaker system(s), and a microphone(s) for use by the listeners. For these vehicles, the activity profile prior to reaching the common destination point 730 may be unimportant for purposes of the event itself. Another vehicle (e.g., the vehicle 725) may have applied an appropriate activity profile (e.g., a Fragile Payload Transportation activity profile) and a user setting(s) to ensure safety of onboard payload (e.g., recording equipment) and another activity profile (e.g., a Fragile Payload Usage activity profile) to ensure safe use of the onboard payload at the event itself (e.g., to record the speaker(s) and/or the listeners). Once the lecture event has ended, the vehicles 705, 710, 715, 720, and 725 may leave the common destination point 730 and embark to a next destination point.

In some embodiments, activity profiles may be represented as a table. FIG. 8 illustrates an example of a table 800 of activity profiles 805 in accordance with one or more embodiments of the present disclosure. Each of the activity profiles 805 may be identified with an identifier 810. The identifier 810 may be arbitrary and utilized for convenience to identify the activity profiles 805. In an embodiment, the vehicle 200 may utilize the table 800. The table 800 may be stored in a user device (e.g., 110), the vehicle 200 (e.g., a cabin system controller of the VCU 210), an activity profile management system (e.g., 130), and/or other device. Each of the activity profiles 805 includes values or states for each of a plurality of cabin characteristics. To change from one activity profile to another activity profile, the cabin system controller of the VCU 210 may communicate instructions to corresponding cabin systems (e.g., one or more of the ECUs 205A-E) to alter a behavior, a location, and/or an orientation of a component (e.g., mechanical component, electrical component, optical component) of the cabin according to values or states for the cabin characteristics. By way of non-limiting examples, the activity profiles 805 include cabin characteristics (e.g., behavior, location, orientation) associated with a first seat and a second seat (denoted by Seat A 815 and Seat B 820, respectively), a desk (denoted by Desk 825), a cabin temperature (denoted by Temp 830), a bed (denoted by Bed 835), a computer (denoted by Computer 840), a conference system (denoted by Conf System 845), and a first light and a second light (denoted by Light A 850 and Light B 855, respectively).

The Seat A 815 cabin characteristic and the Seat B 820 cabin characteristic may each be represented by a vector including values indicative of a set of parameters (X, Y, Z, θ, φ, H), where X represents an X-coordinate, Y represents a Y-coordinate, Z represents a Z-coordinate (e.g., height), θ represents an angular orientation, φ represents a recline angle, and H represents a hardness (e.g., 0 being softest to 5 being hardest). For example, the Seat A 815 cabin characteristic for the Conventional Ride activity profile is defined by a vector $v_{A1}$. The Seat A 815 and Seat B 820 cabin characteristics may direct one or more corresponding ECUs 205 to adjust a position, an orientation, and a hardness of the first seat (e.g., the seat 240A of the vehicle 200) and the second seat (e.g., the seat 245A of the vehicle 200). For example, the ECU(s) may control actuators, magnets, rails, and/or other components to move and/or rotate the first seat and/or the second seat. Similarly, the Desk 825 cabin characteristic may be represented by a vector including provided as a set of parameters (X, Y, Z, θ) to set a position and an orientation of a desk in the vehicle 200. In some cases, the vector may indicative that the desk is in a stowed condition, such as for the Conventional Ride activity profile. The Temp 830 cabin characteristic may be provided as a temperature (e.g., in Fahrenheit). The Temp 830 cabin characteristic may direct one or more corresponding ECUs 205 to adjust a behavior of an HVAC system to effectuate a desired cabin temperature.

The Bed 835 cabin characteristic may be provided as a binary state. In a “no” state, the desk in the vehicle 200 is utilized as a desk. In a “yes” state, the activity profile may form a bed using the seat associated with the Seat A 815 cabin characteristic and the desk associated with the Desk 825 cabin configuration. A span of the bed may be defined by the Seat A 815 cabin characteristic and/or the Desk 825 cabin configuration. In some cases, an activity profile may define a bed cabin configuration for a second bed in the vehicle 200. The Computer 840 cabin characteristic may be provided as a binary state. In a “no” state, a computer is not provided to riders of the vehicle 200. In a “yes” state, a computer is provided on the desk associated with the Desk 825 cabin configuration and turned on. The Conf System 845 cabin characteristic may be provided as a binary state. In a “no” state, a conference system is not provided to riders of the vehicle 200 (e.g., the conference system is turned off and/or stowed). In a “yes” state, the conference system is provided. The Light A 850 cabin characteristic and the Light B 855 cabin characteristic may each be represented by a vector including values indicative of a set of parameters (X, Y, Z, θ, B), where X represents an X-coordinate, Y represents a Y-coordinate, Z represents a Z-coordinate (e.g., height), θ represents an angular orientation, φ represents a recline angle, and B represents a brightness (e.g., 0 being off to 5 being brightest).

It will be appreciated that the activity profiles 805 and cabin characteristics 815, 820, 825, 830, 835, 840, 845, 850, and 855 shown in the table 800 of FIG. 8 may be a sample of activity profiles and cabin characteristics. A table of activity profiles may have more, fewer, and/or different activity profiles and/or cabin characteristics than those provided in the table 800.

In some embodiments, cabin characteristics of the vehicle 200 may be associated with safety margins within which the values of the cabin characteristics may be set while maintaining performance and safety. In some aspects, the safety margins may be provided as part of the certification of the hardware platform utilized by the vehicle 200 to control operation of the vehicle 200. In some cases, since the various operating parameters may be dependent on one another, an adjustment in value of one operating parameter may affect the safety margins associated with one or more of the remaining operating parameters. Such safety margins may be indicative of the user setting(s) that may be safely applied by the user to adjust various ones of the cabin characteristics.

When a user provides a user setting(s), the activity profile with the user setting(s) applied may be validated according to safety ranges associated with various cabin characteristics. The set of rules may be, or may be based on, safety margins associated with the operating parameters. For example, the safety margin may provide minimum and maximum values for various cabin characteristics of the vehicle, such as extreme positions of seats and light sources. In some cases, the minimum and maximum values may be compiled as part of a certification process of the hardware platform of the vehicle 200.

Figure 9:
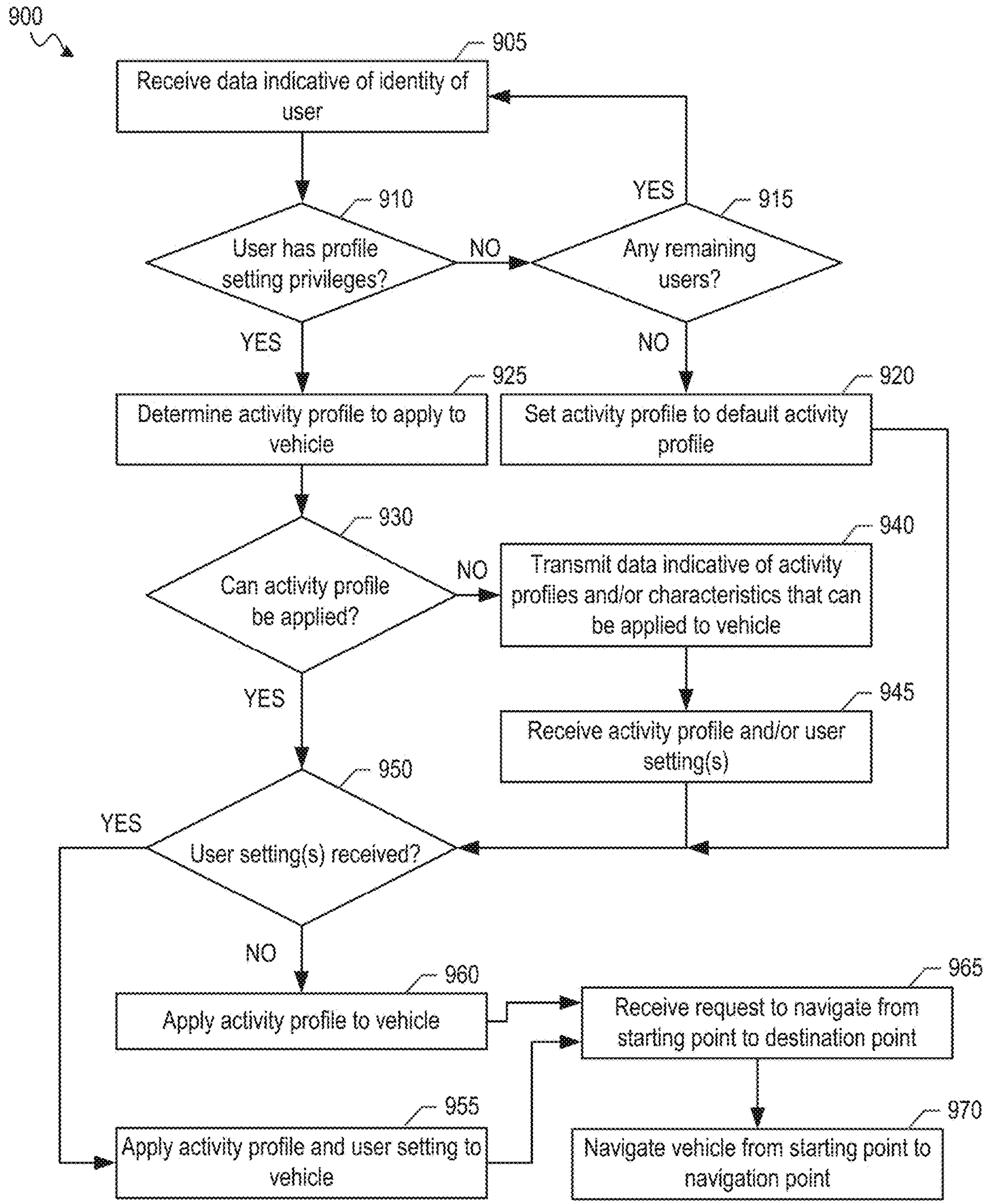
FIG. 9 illustrates a flow diagram of an example of a process for facilitating application and portability of activity profiles and vehicle cabin configuration in accordance with one or more embodiments of the present disclosure.

FIG. 9 illustrates a flow diagram of an example of a process 900 for facilitating application and portability of activity profiles and vehicle cabin configuration in accordance with one or more embodiments of the present disclosure. For explanatory purposes, the process 900 is described herein with reference to the example network environments 100A-D of FIGS. 1A-1D; however, the process 900 is not limited to the example network environments 100A-D of FIGS. 1A-1D. Note that one or more operations may be combined, omitted, and/or performed in a different order as desired.

At block 905, the vehicle 105 receives data indicative of an identity of a user of the vehicle 105. The vehicle 105 may receive the data indicative of the identity from the user device 110 of the user, such as via a wired or wireless connection between the vehicle 105 and the user device 110. In some cases, an application (e.g., app) associated with (e.g., running on) the vehicle 105 may receive the data indicative of the identity from an application associated with (e.g., running on) the user device 110. The vehicle 105 and the user device 110 may have corresponding applications installed to facilitate applying of an activity profile to the vehicle 105.

For example, the vehicle 105 may receive the data from the user device 110 as part of a handshake procedure. The handshake procedure may be initiated (e.g., by the vehicle 105 or user device 110) in accordance with settings provided for the vehicle 105 or the user device 110. The identity of the user may be an account username, an actual name, a contact information, biometrics (e.g., fingerprint, facial landmarks), and/or generally any other information that identifies the user (e.g., to the application installed on the vehicle 105). In some cases, the user may ride the vehicle 105. In other cases, the user does not ride the vehicle 105. For example, the user may rent the vehicle 105 for use by other users or for use for freight. As another example, the user may rent the vehicle 105 to transport a payload and not have any riders.

At block 910, the vehicle 105 determines whether the user has profile setting privileges based on the identity of the user. In some cases, the application associated with the vehicle 105 may determine whether the user has profile setting privileges. If the user does not have profile setting privileges, the process 900 proceeds to block 915. At block 915, the vehicle 105 determines whether there are any remaining users (e.g., users within a threshold distance of the vehicle 105). If there are remaining users, the process 900 proceeds to block 905, in which the vehicle 105 receives data indicative of an identity of another user. If there are no more users (e.g., no users have profile setting privileges), the process 900 proceeds to block 920. At block 920, the vehicle 105 sets the activity profile to be applied to a default activity profile. As an example, the default activity profile may be associated with setting (e.g., maintaining or adjusting) a cabin of the vehicle 105 to a Conventional Ride profile. In some cases, the default activity profile may have previously been set by a manufacturer of the vehicle 105, an administrator of the vehicle 105, or a captain of the vehicle 105.

If the user has profile setting privileges, the process 900 proceeds to block 925. At block 925, the vehicle 105 determines the activity profile associated with the user to apply to the vehicle 105. Application of the activity profile to the vehicle 105 may cause adjustment of the cabin of the vehicle 105 to facilitate a desired cabin experience (e.g., associated by the user with the activity profile). In some aspects, the vehicle 105 is stationary (e.g., in a parked mode) and turned on when the activity profile is applied to the vehicle 105 to adjust at least some characteristics of the cabin of the vehicle 105. In some cases, such as to reduce an amount of time before the vehicle 105 is provided to the user, some aspects of the cabin of the vehicle 105 may be adjusted while the vehicle 105 is moving (e.g., on its way to the user). By way of non-limiting examples, adjustments associated with recline angle of seats and lighting in the cabin may be determined (e.g., by a safety authority) to be safely performable even when the vehicle 105 is moving, whereas adjustments associated with a location of the seats and/or other furniture may be determined to be safely performable only when the vehicle 105 is stationary. In some aspects, the activity profile may be one of a plurality of predetermined activity profiles (e.g., stored on the activity profile management system 130) selectable by the user. In an aspect, the application associated with the vehicle 105 may determine the activity profile to apply to the vehicle 105. In one case, the vehicle 105 may receive the activity profile from the user device 110 of the user. In another case, the vehicle 105 may retrieve the activity profile associated with the user. For example, such information may be retrieved from memory of the vehicle 105 and/or the user profile management system 125.

At block 930, the vehicle 105 determines whether the activity profile can be applied to (e.g., is compatible with) the vehicle 105. In an aspect, the application associated with the vehicle 105 may determine whether the activity profile can be applied to (e.g., is compatible with) the vehicle 105. In some cases, the vehicle 105 may be certified as being compatible with at least a subset of the plurality of predetermined activity profiles. In some cases, to determine compatibility, such as with a user customized activity profile (e.g., "My Meeting" activity profile provided above), the vehicle 105 may parse the activity profile into its individual cabin characteristics. The vehicle 105 may be compatible with the activity profile when the individual cabin characteristics are each within a safety range (e.g., defined during testing and/or post-manufacturing of the vehicle 105). If the vehicle 105 determines that the activity profile can be applied to the vehicle 105, the process 900 proceeds to block 950.

If the vehicle 105 determines that the activity profile cannot be applied to the vehicle 105, the process 900 proceeds to block 940. At block 940, the vehicle 105 transmits, to the user device 110, data indicative of a subset of the predetermined activity profiles and/or cabin characteristics that can be applied to the vehicle 105. For example, the user device 110 may display the subset of the activity profiles on a display of the user device 110 to facilitate selection of a compatible activity profile by the user. In some cases, the vehicle 105 may provide the subset as a ranked list, with a highest ranked activity profile being one the vehicle 105 (e.g., the cabin systems controller of the vehicle 105) considers to be closest to the activity profile the user intends to apply. For example, if the vehicle 105 does not have or is not compatible with a Collaborative Work activity profile, the vehicle 105 may provide a Solitary Work activity profile as the highest-ranking suggestion. In some cases, when vehicle 105 does not have or is not compatible with a certain activity profile, the vehicle 105 may determine or may request values of cabin characteristics that define the certain activity profile and from these values determine whether any of the activity profiles supported by the vehicle 105 is close to the certain activity profile. In some cases, the vehicle 105 may suggest adjustments that the user can provide (e.g., select) as user settings to the certain activity profile to make the certain activity profile compatible for the vehicle 105. At block 945, the vehicle 105 receives an activity profile and/or a user setting(s) in response to the data provided at block 940.

At block 950, the vehicle 105 determines whether any user setting(s) have been received (e.g., from the user device 110). If the vehicle determines that a user setting(s) has been received, the process 900 proceeds to block 955. At block 955, the vehicle 105 applies the activity profile and the user setting(s). To apply the activity profile, control signals may be provided to cabin systems of the vehicle 105 to effectuate appropriate control of objects in the cabin according to the activity profile. Control signals indicative of the user setting(s) may also be provided by the cabin systems. In some cases, the activity profile is applied first to the vehicle 105 and then the user setting(s) applied. In some cases, the activity profile is adjusted with the user setting(s) and then the adjusted activity profile is applied to the vehicle 105. If the vehicle determines that no user setting has been received, the process 900 proceeds to block 960. At block 960, the vehicle 105 applies the activity profile to the vehicle 105.

At block 965, the vehicle 105 receives a request to navigate from a starting point to a destination point. In one example, the request may be from the user device 110. In another example, the request may be provided by the user via a ride hailing service (e.g., to request navigation from the starting point to the destination point at a certain time). In another example, the request may be provided via a GPS of the vehicle 105. In some aspects, the vehicle 105 receives the data indicative of the identity of the user along with at least one of the request to navigate or activity profile to be applied. At block 970, the vehicle 105 navigates from the starting point to the destination point. In some cases, blocks 965 and 970 may be optional in cases that the activity profile is applied to facilitate performance of an activity while the vehicle 105 is stationary.

During the navigation, the vehicle 105 maintains the activity profile applied at block 955 or 960 to facilitate performance of an activity. It is noted that in some cases block 950 is continuously performed by the vehicle 105, since certain cabin characteristics (e.g., adjusting a reclining slope of a seat, making small positional adjustments of a seat or desk, etc.) may be made even when the rider is in the vehicle 105 and the vehicle 105 is moving. The vehicle 105 may receive a user setting(s) and determine whether the user setting(s) may be safely applied and appropriately inform a user (e.g., via a message to the user device 110 or other device). If a user setting(s) cannot be safely applied, the vehicle 105 may send a message inquiring whether the vehicle 105 can be navigated to a parking lot and placed in a stationary mode to apply the user setting(s). The vehicle 105 may navigate to the parking lot to apply the user setting(s) if instructed to do so or continue navigating to the destination point without setting the user setting(s) absent instructions to the contrary. Similarly, in an aspect, to set a different activity profile, the vehicle 105 may send a message inquiring whether the vehicle 105 can be navigated to a parking lot and placed in a stationary state to apply the different activity profile. The vehicle 105 may navigate to the parking lot to apply the different activity profile if instructed to do so or continue navigating to the destination point without setting the different activity profile absent instructions to the contrary.

In some aspects, the user of the user device 110 may transfer vehicle profile setting privileges to another user. For example, the application associated with the vehicle 105 may receive from the application associated with the user device 110 an indication to transfer vehicle profile setting privileges to another user. The application associated with the vehicle 105 may then receive an activity functionality profile from a user device of this other user (e.g., receive from an application associated with this other user's device) and determine whether the activity profile can be applied to the vehicle 105.

Although the process 900 describes an embodiment in which a single user has profile setting privileges, in some embodiments, multiple users can have profile setting privileges. In these embodiments, each user may be associated with a different priority value. The vehicle 105 may identify the user that is associated with a highest priority value and determine the activity profile of this identified user.

In another embodiment, if the vehicle 105 determines that no users in proximity of (e.g., within or within a predetermined distance to) the vehicle 105 have profile setting privileges, such as in a case no captain(s) rides the vehicle 105, a captain(s) of the vehicle 105 may provide a setting that allows users (e.g., non-captains) of the vehicle 105 to provide their activity profiles in one or more specified manners. For example, the vehicle 105 may be set to allow any users with appropriate hardware and/or software (e.g., appropriate application installed on user device and/or appropriate subscription to service) to provide their activity profile in the specified manner(s). In an aspect, non-captains cannot transfer profile setting privileges but can provide their activity profile and/or user settings to effectuate change (e.g., change consistent with or otherwise does not disrupt application of the captain's activity profile) to a cabin of the vehicle 105 according to their activity profile and/or user settings. For instance, a non-captain may apply her activity profile and/or user setting to change a seat position and/or orientation for maximum comfort. As a particular example, a specified manner may be for a user to provide the user's device in proximity (e.g., with communication range) to an NFC chip in the vehicle 105 to allow communication of appropriate data (e.g., user's identity, activity profile, and/or user setting(s)) to the vehicle 105.

As described in the foregoing, the vehicle 105 performs the process 900 in some embodiments. In other embodiments, with reference to the network environment 100D of FIG. 1D, the vehicle management system 155 may perform the process 900. In some cases, the vehicle management system 155 may host a website to facilitate buying, selling, renting, and/or sharing of vehicles. In these cases, as an example, the vehicle management system 155 may provide a listing of vehicles and activity profiles compatible with each vehicle. The vehicle management system 155 may receive a user's identity (e.g., block 905) when the user logs into the website. The vehicle management system 155 may determine an activity profile of the user (e.g., block 925), such as based on user selection of an activity profile or based on information previously provided by the user (e.g., stored as part of the user's profile for the user's website account). In some cases, the user may store the same or different activity profile on the user device 110, user profile management system 125, and/or vehicle management system 155, such that the user does not need to manually provide the activity profile each time the user uses a service provided by the vehicle management system 155. In some cases, a local activity profile version (e.g., locally stored version of an activity profile) stored in the user device 110 takes precedence over a version of the activity profile stored in the user profile management system 125 and the vehicle management system 155. The vehicle management system 155 may apply the activity profile to adjust a cabin of an appropriate vehicle (e.g., block 955 or 960) by transmitting instructions to the vehicle that, when executed by the vehicle, causes the vehicle to apply the activity profile (e.g., to transform the cabin according to the user's desired cabin configuration). In some cases, the vehicle provided to the user may be selected by the user. In other cases, the vehicle provided to the user may be selected by the vehicle management system 155 (e.g., based on activity profile, user settings, cost preferences, and/or other preferences provided by the user). In some aspects, the vehicle 105, the user device 110, and the vehicle management system 155 may have applications installed and running thereon to facilitate selecting and/or applying of an activity profile to change cabin characteristics of the vehicle 105.

Figure 10:
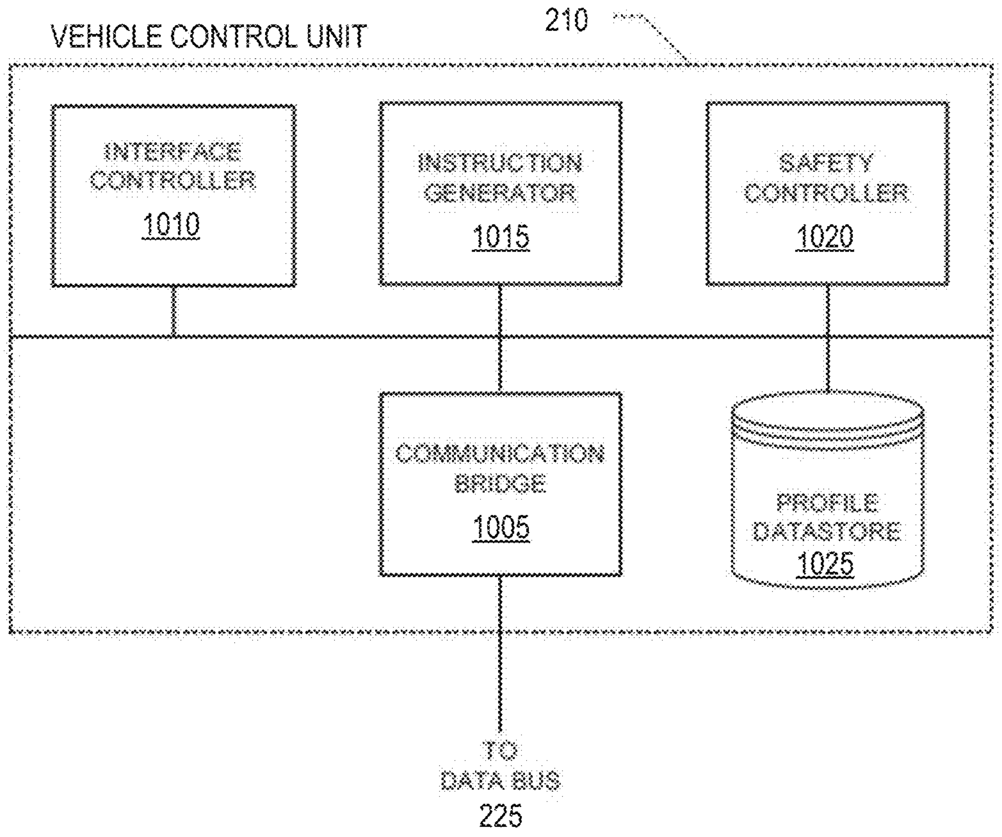
FIG. 10 is a block diagram of an example implementation of a vehicle control unit of the vehicle of FIG. 2 in accordance with one or more embodiments of the present disclosure.

FIG. 10 is a block diagram of an example implementation of the VCU 210 of FIG. 2 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. In an embodiment, a cabin systems controller may be, may include, or may be a part of the VCU 210.

The VCU 210 includes a communication bridge 1005, an interface controller 1010, an instruction generator 1015, a safety controller 1020, and an activity profile data store 1025. The communication bridge 1005 may manage communication originating from or directed to the VCU 210. The communication bridge 1005 is coupled to the data bus 225 and the vehicle communication unit 215. In an aspect, the communication bridge 1005 may be utilized to apply changes to the activity profile of the vehicle 200 by transmitting the signals to alter the operating parameters of the ECUs in the vehicle 200. The communication bridge 1005 may encode and decode messages between the VCU 210 and other components of the vehicle 200 (e.g., the ECUs 205, the vehicle communication unit 215, the infotainment unit 220, etc.) via the data bus 225. For example, the communication bridge 1005 may manage messages of the VCU 210 to be sent to corresponding ECUs 205 based on changes to the cabin dictated by a requested activity profile. In some cases, the VCU 210 may leverage the communication bridge 1005 to communicate with a user device (e.g., a smartphone) and/or a remote server using the vehicle communication unit 215 to establish an external data connection (e.g., Wi-Fi, LTE, Bluetooth, NFC, etc.). In some cases, the communication bridge 1005 may drive the vehicle communication unit 215 (e.g., powers the antenna in the radio frequency waveguide, drives the loop-inductor-antenna of the NFC system, etc.).

The interface controller 1010 may detect requests to alter the activity profile of the vehicle 200. In FIG. 10, the interface controller 1010 is in communication with the communication bridge 1005, instruction generator 1015, safety controller 1020, and activity profile data store 1025. For example, a request to alter the activity profile of the vehicle 200 may be selected by a rider via interaction with the rider's smartphone (e.g., user device 110). The interface controller 1010 may detect the request and the selected activity profile (e.g., via a message communicated across the data bus 225 via the vehicle communication unit 215).

In some cases, when a request to change the activity profile applied to the vehicle 200 is detected, the interface controller 1010 may verify whether the requested activity profile is stored locally (e.g., in the activity profile data store 1025). If the requested activity profile is not stored locally, the interface controller 1010 may generate a request to a remote device and/or server (e.g., the activity profile management system 130) to obtain the requested activity profile (e.g., via the communication bridge 1005). In this regard, the interface controller 1010 may generate a request to the remote device and/or server to obtain data associated with the requested activity profile, such as values for operating parameters that define the activity profile and/or an indication of whether the requested activity profile may be applied to the vehicle 200. When obtained, the requested activity profile may be stored in the activity profile data store 1025 (e.g., for current and future use) and verified as being stored locally.

In an aspect, the requested activity profile may be associated with a time to live parameter. For a given activity profile, a value of the time to live parameter may be, or may be indicative of, a duration of time that the activity profile remains locally stored without being used. If the activity profile has not been used for the duration of time indicated by the time to live parameter, the locally stored profile may be deleted to free up local storage. If the activity profile is used at any time within the duration indicated by the time to live parameter, an associated timer is reset and the activity profile may remain stored in the local storage for the duration of time. For instance, for a given locally stored activity profile, a timer may have a time t monotonically increasing from 0 and $t_{TTL}$, where $t_{TTL}$ is the duration of time indicated by the time to live parameter. Once the timer reaches $t_{TTL}$ without the locally stored activity profile having been used, the locally stored activity profile may be referenced as having expired and may be deleted. If the locally stored activity profile is used at a time between 0 and $t_{TTL}$, the timer is reset to 0 from which it starts monotonically increasing from 0 to $t_{TTL}$ until a subsequent application of the activity profile. The time to live parameter may be set to a default value by the vehicle 200. The default value may be set by a provider of the vehicle 200, a provider of an app installed on the vehicle 200 associated with applying activity profiles to the vehicle 200, and/or the user of the vehicle 200 (e.g., via a cloud portal and/or an app). In some cases, the vehicle 200 and/or the user may set a different default value for the time to live parameter for different activity profiles.

When the activity profile is verified as stored locally, the interface controller 1010 may provide the requested activity profile to the instruction generator 1015. The instruction generator 1015 may parse the obtained activity profile into cabin characteristics and associated values. The instruction generator 1015 may generate and transmit instructions to the ECUs 205 of the vehicle 200. The instructions may be executed by the ECUs 205 to cause the ECUs 205 to adjust values (e.g., behavior, position, orientation) for their corresponding cabin characteristics of the vehicle 200. By enacting the changes to the values, the desired/requested activity profile is applied to the vehicle 200. In some cases, the instruction generator 1015 may determine which of the ECUs 205 are associated with the parsed cabin characteristics to properly generate cabin characteristic adjustment instructions. To that end, the instruction generator 1015 may be provided with a table that lists the ECUs 205, the ECUs' instruction set language, and which operating parameters the ECUs 205 utilize/control.

In an embodiment, when an activity profile may be adjusted (e.g., within confines of safety margins), the values for the cabin characteristics of the adjusted activity profile may be provided to the safety controller 1020 so that they may be validated. In one case, the adjusted values may be provided by a user device of a vehicle user. In another case, the adjusted values may be provided by an activity profile management system, with adjustments being made to adjust baseline behaviors, locations, and/or orientations. In some cases, adjustments may also be made by a vehicle safety controller and user confirmation of these adjustments be obtained before application of the adjustments. If the safety controller 1020 verifies that the values for the cabin characteristics and combinations thereof are within the safety margins for the vehicle that is being used, the values (e.g., adjusted safe values or original safe values) may be transmitted back to the instruction generator 1015. The instruction generator 1015 may generate and transmit instructions for the ECUs 205 based on the adjusted values (e.g., validated safe values, which may be original safe values or adjusted safe values) of the cabin characteristics. In some cases, the adjusted activity profile may be stored in the activity profile data store 1025 for future use (e.g., by the user who provided the user setting(s)). A local activity profile version utilized by the instruction generator 1015 may take precedence over a version of the activity profile stored in a user device (e.g., 110), a user profile management system (e.g., 125), a vehicle management system (e.g., 155), and/or elsewhere. In this regard, the local activity profile version utilized by the instruction generator 1015 may include adjustments made (e.g., for safety) to the version of the activity profile stored in the user device, the user profile management system, the vehicle management system, and/or elsewhere.

If the safety controller 1020 determines that one or more values of the cabin characteristics are outside the safety margin, and/or a combination of the values may be unsafe, the safety controller 1020 may transmit an indication to the instruction generator 1015 to not create and/or transmit instructions to the ECUs 205. In one example, the safety controller 1020 may communicate with the user device via the communication bridge 1005, data bus 225, and vehicle communication unit 215 to indicate the error, request the user to authorize the vehicle 200 to use the activity profile without adjustment, request the user to authorize the vehicle 200 to use the activity profile with appropriate adjustments to ensure safety, or request the user to provide another activity profile and/or request the user to provide user setting(s) (e.g., different values for the cabin characteristics). In other examples, the safety controller 1020 may adjust, or inform the instruction generator 1015 to adjust, the values of the cabin characteristics to conform to safe values based on the safety margins. The activity profile data store 1025 may store activity profiles. The activity profiles may be acquired remotely via the communication bridge 1005, such as from the activity profile management system 130.

Figure 11:
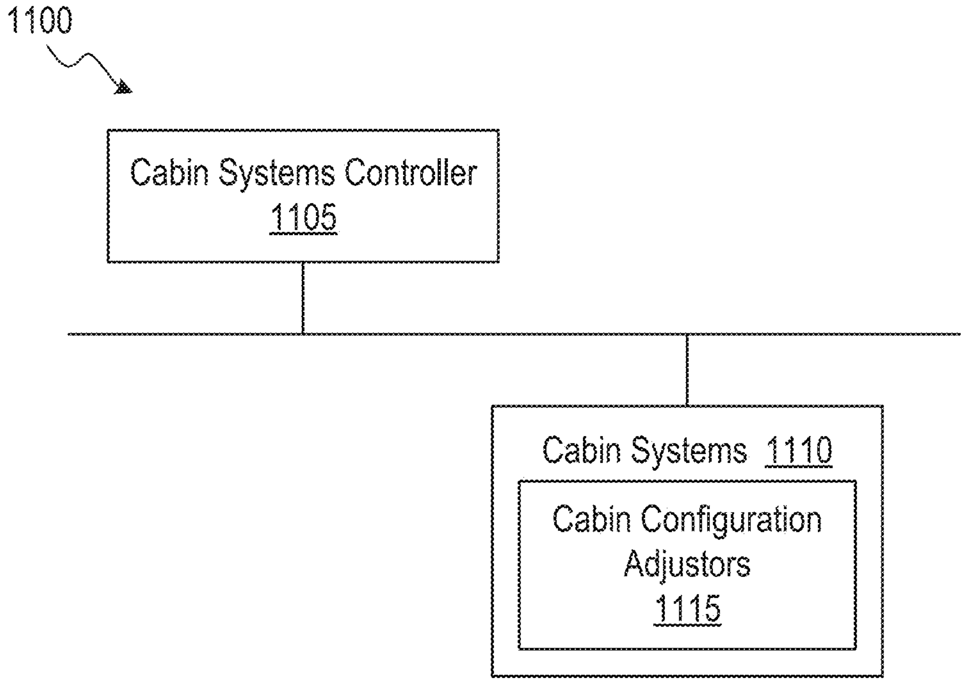
FIG. 11 illustrates a block diagram of an example of a system for facilitating application and portability of activity profiles and vehicle cabin configuration in accordance with one or more embodiments of the present disclosure.

FIG. 11 illustrates a block diagram of an example of a system 1100 for facilitating application and portability of activity profiles and vehicle cabin configuration in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. In an embodiment, the cabin systems controller 1105 may be, may include, or may be a part of the VCU 210 of FIG. 2.

The system 1100 includes a cabin systems controller 1105 and cabin systems 1110. The cabin systems controller 1105 of a vehicle may receive an indication (e.g., from the communication bridge 1005) of an activity profile to apply to the vehicle, generate instructions based on the activity profile, and transmit the instructions to appropriate ones of the cabin systems 1110 to effectuate desired adjustments to the vehicle's cabin. In this regard, the instructions may cause the cabin systems 1110 to adjust a configuration (e.g., a behavior, a location, and/or an orientation) of an aspect/portion of (e.g., an object in) the vehicle's cabin. The cabin systems controller 1105 may verify that the cabin systems are receiving and complying with (e.g., successfully implementing) the instructions to achieve a desired cabin configuration. In some aspects, in addition to the activity profile, the cabin systems controller 1105 may also receive one or more user settings (e.g., also referred to as user customizations or user preferences) to adjust one or more characteristics of the cabin. The cabin systems controller 1105 may generate the instructions based on the activity profile as well as the user setting(s). In an aspect, the cabin systems controller 1105 may implement at least a portion of the instruction generator 1015 of FIG. 10. In some cases, the user setting(s) provides an adjustment(s) to a cabin configuration provided by the activity profile. In this regard, a user may provide user setting(s) to personalize/customize the activity profile to better suit the user.

The cabin systems 1110 may collectively (e.g., in the aggregate) operate to configure the vehicle's cabin to facilitate a performance of an activity at least in part by providing a certain cabin experience (e.g., creating an environment or ambience in the cabin). The performance of the activity can be facilitated during navigation of the vehicle and/or while the vehicle is stationary. In some aspects, for a given cabin system, a configuration adjusted by the cabin system may include a behavior, a location, and/or an orientation, such as of an object controlled by the cabin system. Each of the cabin systems 1110 may adjust a behavior, a location, and/or an orientation of a respective one or more cabin characteristics such as, by way of non-limiting examples, illumination (e.g., lighting); audio; video; HVAC; furniture; communications; safety; power; appliances; computing devices; and external visibility. In an embodiment, each of the cabin systems 1110 may be provided by one or more ECUs (e.g., such as one or more the ECUs 205) of the vehicle.

The cabin systems 1110 include cabin configuration adjustors 1115. The cabin configuration adjustors 1115 may include switches, rails, power sources, motors, pumps, magnets, and/or generally any component appropriate to adjust a cabin configuration of the vehicle's cabin. A component may be a mechanical component, an electrical component, an optical component, a magnetic component, or combination thereof (e.g., electro-mechanical component). For example, the cabin systems controller 1105 may instruct the cabin systems 1110 to move and/or rotate an object in the cabin. To effectuate a desired movement and/or rotation of the object in the cabin, the cabin configuration adjustors 1115 (e.g., formed of actuators, rails, poles, and/or magnets) may be used/operated. As non-limiting examples, behavior of objects may include: cushion inflation for a piece of furniture for user comfort, ambient noise/audio amplification, color emitted by a light source(s), video camera and microphone functionality for conferencing or entertainment, and so forth.

Figure 12:
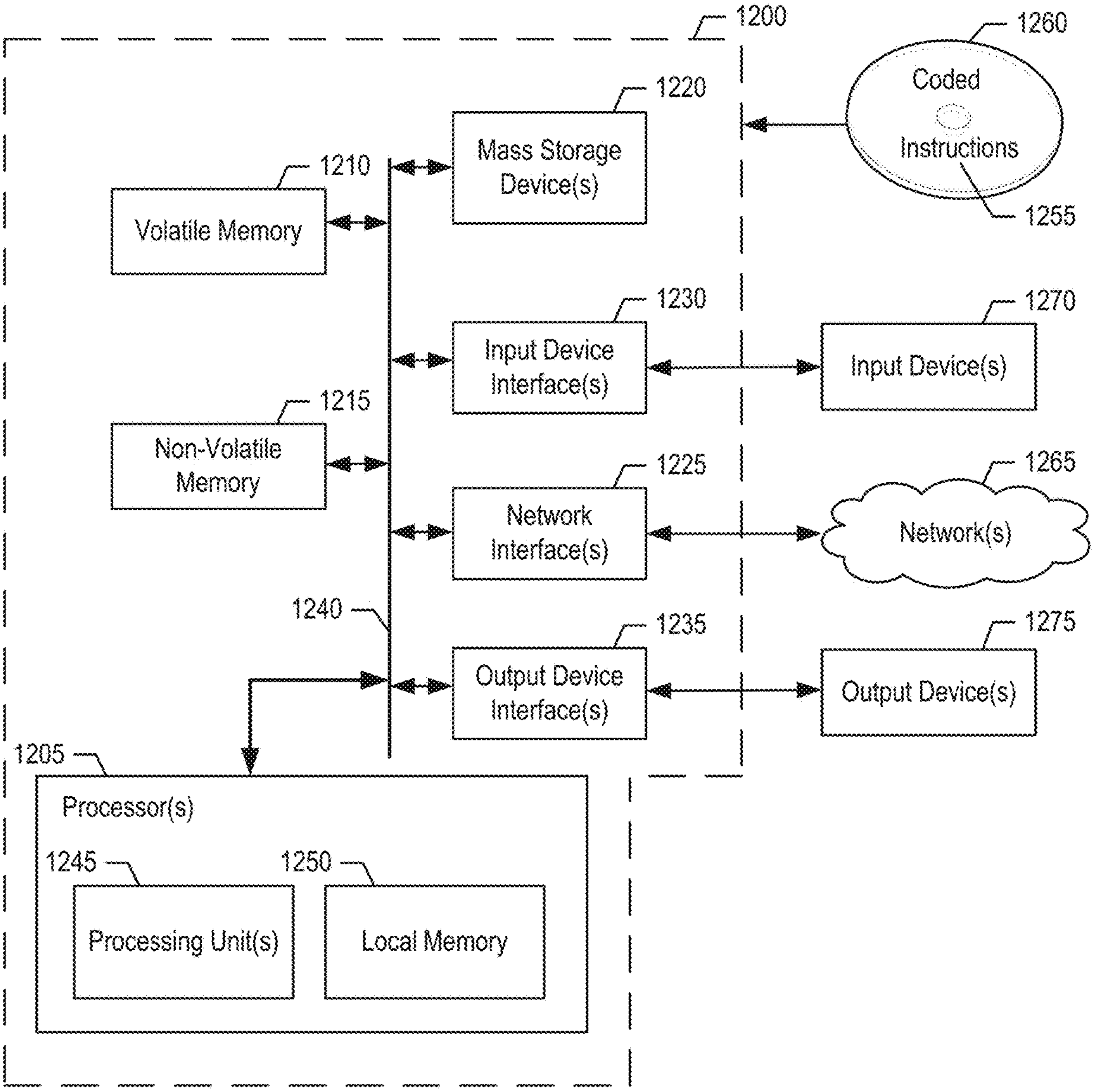
FIG. 12 illustrates a block diagram of an example of an electronic system with which one or more embodiments of the present disclosure may be implemented.

FIG. 12 illustrates a block diagram of an example of an electronic system 1200 with which one or more embodiments of the present disclosure may be implemented. In an embodiment, the electronic system 1200 may be, may include, or may be referred to as, processor platform. The electronic system 1200 can generally be any type of computing device. In an embodiment, the electronic system 1200 can be, can include, and/or can be a part of, one or more of the vehicle 105, user device 110, network 120 (e.g., access points of the network 120), user profile management system 125, activity profile management system 130, vehicle 135, user device 140, vehicle 145, user device 150, vehicle management system 155, and vehicle 200 shown in FIGS. 1A-1D and 2, and/or components thereof (e.g., VCU 210). For example, the electronic system 1200 may be, may include, or may be a part of, the vehicle 105.

The electronic system 1200 includes one or more processors 1205, volatile memory 1210, non-volatile memory 1215, one or more mass storage devices 1220, one or more network interfaces 1225, one or more input device interfaces 1230, one or more output device interfaces 1235, and a link 1240. The link 1240 may be, may include, or may be implemented by, a bus, one or more point-to-point connections (e.g., intra-chip connections and/or inter-chip connections), and/or other connections for facilitating connection of and/or communication between various components of the electronic system 1200.

The link 1240 couples (e.g., connects) to the processor(s) 1205. In an aspect, the processor(s) 1205 of the illustrated example is hardware. For example, the processor(s) 1205 can be implemented by one or more integrated circuits, logic circuits, processors, and/or controllers from any desired family or manufacturer. The processor(s) 1205 includes one or more processing units 1245 configured via instructions 1255 stored in a local memory 1250 (e.g., a cache) of the processor(s) 1205. In an aspect, the instructions 1255 may include instructions that when executed, perform at least some instructions of FIG. 9. The processor(s) 1205 is in communication with the volatile memory 1210, non-volatile memory 1215, and the mass storage device(s) 1220 via the link 1240.

The link 1240 couples (e.g., connects) to the volatile memory 1210, non-volatile memory 1215, and mass storage device(s) 1220. The volatile memory 1210 may include synchronous dynamic RAM (SDRAM), dynamic RAM (DRAM), static RAM (SRAM) Rambus dynamic RAM (RDRAM), and/or other types of volatile memory. The non-volatile memory 1215 may include read-only memory (ROM), programmable ROM (PROM), erasable programmable ROM (EPROM), electrically erasable programmable ROM (EEPROM), flash memory, non-volatile RAM (NVRAM), and/or other types of non-volatile memory. The non-volatile memory 1215 may store instructions and data even when the electronic system 1200 is off. The mass storage device(s) 1220 may include floppy disk drives, hard disk drives, compact disk drives, DVD drives, Blu-ray Disc™ drives, redundant array of independent disks (RAID) systems, solid state memories, and/or other devices that allow storage. Access to the volatile memory 1210, non-volatile memory 1215, and mass storage device(s) 1220 may be controlled by a memory controller (not shown). In an aspect, the coded instructions 1255 corresponding to at least some instructions of FIG. 9 may be stored in the volatile memory 1210, non-volatile memory 1215, mass storage device(s) 1220, local memory 1250, and/or on a removable tangible computer readable storage medium, such as a disk 1260 (e.g., CD, DVD, or Blu-ray Disc™).

The link 1240 couples (e.g., connects) to the network interface(s) 1225. The network interface(s) 1225 may couple the electronic system 1200 to one or more networks 1265. In this manner, the electronic system 1200 can be a part of a network of devices, such as a local area network (LAN), a WAN, or an Intranet, or a network of networks, such as the Internet. In an embodiment, the network interface(s) 1225 may facilitate communication between the electronic system 1200 and a cellular network, such as a cellular network that includes the network 120 of FIGS. 1A-1D. The network interface(s) 1225 may be implemented by any type of interface standard, such as an Ethernet interface, a USB interface, a PCI express interface, a wireless network interface (e.g., wireless LAN interface), a Wi-Fi network interface, a cellular network interface, an NFC interface, a Bluetooth interface, and/or other interfaces. For example, a cellular network interface may provide support for GSM-based cellular networks, LTE-based cellular networks, 5G-based (and beyond) cellular networks, code division multiple access (CDMA)-based cellular networks, and/or other cellular networks. The network interface(s) 1225 may include a communication device such as a transmitter, receiver, transceiver, modem, and/or network interface card to facilitate exchange of data with external machines (e.g., computing devices of any kind) via the network(s) 1265. In some cases, the network interface(s) 1225 may support Internet of Things (IoT) technologies.

The link 1240 couples (e.g., connects) to the input device interface(s) 1230. The input device interface(s) 1230 may couple the electronic system 1200 to one or more input devices 1270. The input device(s) 1270 may enable a user to provide (e.g., enter) data and commands to the electronic system 1200. For example, the user may be an operator of the vehicle 105 when the electronic system 1200 is disposed in the vehicle 105 or when the electronic system 1200 is a control device (e.g., the user device 110) of the vehicle 105. The input device(s) 1270 may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the electronic system 1200. Also, many systems, such as the electronic system 1200, can allow a user to provide data and commands using physical gestures, such as, but not limited to, hand or body movements, facial expressions, and face recognition. In this regard, the user input may be received in any form, such as audio (e.g., speech), visual, and/or tactile. For example, in an aspect, to adjust an activity profile applied to a vehicle (e.g., the vehicle 105), a user device (e.g., the user device 110) that is, includes, or is a part of the electronic system 1200, the user may select an activity profile via a mouse communicatively connected to the electronic system 1200 via the input device interface(s)

1230. The selection via a mouse click may be relayed to the processor(s) 1205 via the input device interface(s) 1230 and the link 1240. The processor(s) 1205 may process the selection into commands to adjust the activity profile applied to the vehicle.

The link 1240 couples (e.g., connects) to the output device interface(s) 1235. The output device interface(s) 1235 may couple the electronic system 1200 to one or more output devices 1275. The output device interface(s) 1235 may include a graphics and/or audio driver card, graphics and/or audio driver chip, and/or graphics and/or audio driver processor. The output device(s) 1275 may enable the electronic system 1200 to provide output information to a user. The output device(s) 1275 may include, for example, display devices (e.g., a light emitting diode (LED), an organic LED (OLED), a liquid crystal display (LCD)), audio devices (e.g., speakers), audiovisual devices (e.g., augmented reality (AR) devices, virtual reality (VR) devices), and/or other output devices. In this regard, the output information may provide feedback to the user in any form, such as visual feedback, auditory feedback, and/or tactile feedback. The output information may be provided to a user's device through a wireless interface. For example, in an aspect, a vehicle (e.g., the vehicle 105) that is, includes, or is a part of the electronic system 1200 may provide operational characteristics, such as remaining battery power, remaining fuel level, remaining actions to be performed, current position, component health (e.g., engine health, battery health), an identification of the vehicle captain, and/or an activity profile currently applied or in the process of being applied to the vehicle, to a display coupled to the vehicle (e.g., wired or wirelessly coupled) via the output device interface(s) 1235 and viewable by the user.

In one or more embodiments, FIG. 9 illustrates example machine readable instructions for the vehicle 105 and/or the vehicle management system 155. In these examples, the machine-readable instructions may include one or more programs for execution by one or more processors, such as the processor(s) 1205 shown in the electronic system 1200. The one or more programs, or portion(s) thereof, may be embodied in software stored on a tangible computer readable storage medium, such as a compact disk (CD), a floppy disk, a hard drive, a digital versatile disk (DVD), a Blu-ray Disc™, and/or other storage device/disk storing the software and/or firmware associated with the processor(s) 1205, but the entire program or programs and/or portions thereof may alternatively be executed by a device other than the processor(s) 1205, and/or embodied in firmware or dedicated hardware (e.g., implemented by one or more analog and/or digital circuit, application specific integrated circuits (ASICs), programmable logic devices (PLDs), and/or field programmable logic devices (FPLDs), discrete logic, etc.). Further, although the example program(s) is described with reference to the flow diagram illustrated in FIG. 9, many other methods may be used. For example, with reference to the flow diagrams illustrated in FIG. 9, the order of execution of the blocks may be changed, and/or some of the blocks described may be changed, removed, combined, and/or subdivided into multiple blocks.

The example process 900 of FIG. 9 may be implemented using coded instructions (e.g., computer and/or machine readable instructions) stored on a tangible computer readable storage medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). Alternatively or in addition, the example process 900 of FIG. 9 may be implemented using coded instructions (e.g., computer and/or machine readable instructions) stored on a non-transitory computer and/or machine readable medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). As used herein, the terms "tangible computer readable storage medium" and "non-transitory computer readable medium" are expressly defined to include any type of computer readable storage device and/or storage disk and to exclude propagating signals and to exclude transmission media. As used herein, "tangible computer readable storage medium" and "tangible machine-readable storage medium" are used interchangeably.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of the present disclosure is not limited to such standards and protocols. For instance, each of the standards for Internet and other packet switched network transmission (e.g., Transmission Control Protocol (TCP)/Internet Protocol (IP), User Datagram Protocol (UDP)/IP, Hypertext Markup Language (HTML), Hypertext Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by the present disclosure and are intended to be included within the scope of the accompanying claims.

Additionally, although embodiments of the present disclosure provide example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the foregoing provides example systems, methods, and articles of manufacture, the examples are not of the only way to implement such systems, methods, and articles of manufacture. Therefore, although certain example methods, apparatus, and articles of manufacture have been described herein, the scope of coverage of the present disclosure is not limited thereto. On the contrary, the present disclosure covers all methods, apparatus, and articles manufacture fairly falling within the scope of the claims either literally or under the doctrine of equivalents.

What is claimed is:

1. A method, comprising:

receiving, by network equipment comprising a processor, a request for a coordinated activity associated with an event, wherein the request identifies a first vehicle type and a second vehicle type, wherein the first vehicle type is different from the second vehicle type, and wherein the coordinated activity comprises a first activity for the first vehicle type and a second activity for the second vehicle type;

receiving, by the network equipment from user devices associated with users, authentication data indicative of respective identities of the users associated with the request, wherein the authentication data is received as part of a handshake procedure between each of the user devices and at least one of the network equipment, the first vehicle type, the second vehicle type or a combination thereof;

authenticating, by the network equipment, the users based on the authentication data;

determining, by the network equipment based on the identities of the users, whether each user has activity profile setting privileges;

determining, by the network equipment, a priority value for each of the users having the activity profile setting privileges;

selecting, by the network equipment, a user having a highest priority value from among the users having the activity profile setting privileges resulting in a selected user;

in response to determining that the selected user has activity profile setting privileges and based on an event type of the event, selecting, by the network equipment, a first activity profile associated with the selected user for the first vehicle type, and a second activity profile associated with the selected user for the second vehicle type, wherein the first activity profile includes one or more first parameters associated with the first vehicle type, the first parameters configured to control a desired cabin environment for the event, including changes to cabin illumination, audio, video, heating, and ventilation, and wherein the second activity profile includes one or more second parameters associated with the second vehicle type, the second parameters configured to control aerial positioning for the event;

coordinating, by the network equipment, travel of a first vehicle of the first vehicle type and a second vehicle of the second vehicle type from respective starting points to a common destination point associated with the event;

applying, by the network equipment, the first activity profile to the first vehicle to perform the first activity in coordination with the second vehicle, wherein the first activity profile is applied upon arrival at the common destination point; and applying, by the network equipment, the second activity profile to the second vehicle to perform the second activity in coordination with the first vehicle, wherein the second activity profile is applied to the second vehicle upon arrival at the common destination point.

2. The method of claim 1, wherein the first vehicle type is a passenger vehicle type.

3. The method of claim 2, wherein the first activity comprises transporting a passenger associated with the request to a location associated with the event.

4. The method of claim 1, wherein the second vehicle type is an aerial drone type.

5. The method of claim 4, wherein the second activity comprises video recording the event.

6. The method of claim 5, wherein the second activity further comprises movement of video recording equipment.

7. The method of claim 1, wherein the event type is a concert type.

8. Network equipment, comprising:

a processor; and a memory that stores executable instructions that, when executed by the processor, facilitate performance of operations, comprising:

receiving, from a user equipment of a plurality of users, a request for a coordinated activity associated with an event, wherein the request identifies a first vehicle type and a second vehicle type, wherein the first vehicle type is different from the second vehicle type, and wherein the coordinated activity comprises a first activity for the first vehicle type and a second activity for the second vehicle type;

receiving, from user equipment of the plurality of users, authentication data indicative of respective identities of the plurality of users associated with the request, wherein the authentication data is received as part of a handshake procedure between each of the user equipment and at least one of the network equipment, the first vehicle, the second vehicle or a combination thereof;

authenticating the plurality of users based on the authentication data;

determining, based on the respective identities of the plurality of users, whether each user has activity profile setting privileges;

determining a priority value for each of the users having the activity profile setting privileges;

selecting a user having a highest priority value from among the users having the activity profile setting privileges resulting in a selected user;

choosing, in response to determining that the selected user has activity profile setting privileges and based on an event type of the event, a first activity profile associated with the selected user for the first vehicle type, and a second activity profile associated with the selected user for the second vehicle type, wherein the first activity profile includes one or more first parameters associated with the first vehicle type, the first parameters configured to control a first vehicle type cabin environment for the event, including changes to cabin furniture, communications, power, and external visibility, and wherein the second activity profile includes one or more second parameters associated with the second vehicle type, the second parameters configured to control a second vehicle type payload deployment for the event;

coordinating travel of a first vehicle of the first vehicle type and a second vehicle of the second vehicle type from respective starting points to a common destination point associated with the event;

transmitting the first activity profile to the first vehicle to perform the first activity in coordination with the second vehicle, wherein the first activity profile is transmitted to the first vehicle upon arrival at the common destination point; and transmitting the second activity profile to the second vehicle to perform the second activity in coordination with the first vehicle, wherein the second activity profile is transmitted to the second vehicle upon arrival at the common destination point.

9. The network equipment of claim 8, wherein the first vehicle type is a type representative of a passenger vehicle.

10. The network equipment of claim 9, wherein the first activity comprises transporting a user of the user equipment to a location associated with the event.

11. The network equipment of claim 8, wherein the second vehicle type is a type representative of a drone vehicle.

12. The network equipment of claim 11, wherein the second activity comprises a recording of the event.

13. The network equipment of claim 12, wherein the second activity further comprises obtaining payload comprising recording equipment.

14. The network equipment of claim 8, wherein the event type is a type representative of a parade.

15. A non-transitory machine-readable medium, comprising executable instructions that, when executed by a processor, facilitate performance of operations, comprising:

receiving a request for a coordinated activity associated with an event, wherein the request identifies a first vehicle type and a second vehicle type, wherein the first vehicle type is different from the second vehicle type, and wherein the coordinated activity comprises a first activity for the first vehicle type and a second activity for the second vehicle type;

receiving, from user devices associated with a plurality of users, authentication data indicative of respective identities of the plurality of users associated with the request, wherein the authentication data is received as part of a handshake procedure between each of the user devices and at least one of network equipment, the first vehicle, the second vehicle, or a combination thereof;

authenticating the plurality of users based on the authentication data;

determining, based on the respective identities of the plurality of users, whether each user has activity profile setting privileges;

determining a priority value for each of the users having the activity profile setting privileges;

selecting a user having a highest priority value from among the users having the activity profile setting privileges resulting in a selected user;

selecting, in response to determining that the selected user has activity profile setting privileges and based on an event type of the event, a first activity profile associated with the selected user for the first vehicle type, and a second activity profile associated with the selected user for the second vehicle type, wherein the first activity profile includes one or more first parameters associated with the first vehicle type, the first parameters configured to control a first vehicle type cabin behavior, location, and an orientation associated with illumination for the event, and wherein the second activity profile includes one or more second parameters associated with the second vehicle type, the second parameters configured to control a second vehicle type operation of video recording equipment for the event;

coordinating travel of a first vehicle of the first vehicle type and a second vehicle of the second vehicle type from respective starting points to a common destination point associated with the event;

communicating the first activity profile to the first vehicle to perform the first activity in coordination with the second vehicle, wherein the first activity profile is communicated to the first vehicle upon arrival at the common destination point; and communicating the second activity profile to the second vehicle to perform the second activity in coordination with the first vehicle, wherein the second activity profile is communicated to the second vehicle upon arrival at the common destination point, and wherein the first activity profile and the second activity profile cause the first vehicle and the second vehicle to form a unified event environment for the event.

16. The non-transitory machine-readable medium of claim 15, wherein the first vehicle type is indicative of a passenger vehicle.

17. The non-transitory machine-readable medium of claim 16, wherein the first activity comprises transporting a passenger associated with the request to a location associated with the event.

18. The non-transitory machine-readable medium of claim 15, wherein the second vehicle type is indicative of an unmanned aerial vehicle.

19. The non-transitory machine-readable medium of claim 18, wherein the second activity comprises a recording of the event.

20. The non-transitory machine-readable medium of claim 19, wherein the second activity further comprises obtaining payload comprising recording equipment.

* * * * *